(12) United States Patent
Nguyen et al.

(10) Patent No.: US 11,526,335 B2
(45) Date of Patent: Dec. 13, 2022

(54) DIGITAL ENGINEERING PLATFORM CONFIGURED TO SUPPORT FUTURE SPACE SYSTEMS DEVELOPMENT AND ACQUISITION

(71) Applicant: The Aerospace Corporation, El Segundo, CA (US)

(72) Inventors: Tien M. Nguyen, Yorba Linda, CA (US); Andrew T. Guillen, Redondo Beach, CA (US); Anh X. Dang, Redondo Beach, CA (US); Thomas O. Freeze, El Segundo, CA (US); Jake T. Singh, Los Angeles, CA (US); Alexander K. Chang, Long Beach, CA (US); Faisal M. Zahidi, Chino Hills, CA (US); Hung H. Nguyen, Chantilly, VA (US); Jonathan H. Lee, Los Angeles, CA (US); Vahe Y. Avedissian, Rolling Hills, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 60 days.

(21) Appl. No.: 17/173,465

(22) Filed: Feb. 11, 2021

(65) Prior Publication Data

US 2022/0253290 A1    Aug. 11, 2022

(51) Int. Cl.
*G06F 8/35*      (2018.01)
*G06F 16/22*     (2019.01)
(Continued)

(52) U.S. Cl.
CPC ............ *G06F 8/35* (2013.01); *G06F 9/44505* (2013.01); *G06F 9/4881* (2013.01); *G06F 9/541* (2013.01);
(Continued)

(58) Field of Classification Search
CPC ...... G06F 8/35; G06F 16/289; G06F 16/2282; G06F 9/44505; G06F 9/4881; G06F 9/541
(Continued)

(56) References Cited

U.S. PATENT DOCUMENTS 8,095,898 B1 *   1/2012   Wu ........................ G06F 30/00
                                                      716/139
9,621,428 B1 *   4/2017   Lev ..................... H04L 41/0806
                          (Continued)

OTHER PUBLICATIONS

AGI Digital Engineering, URL: http://agi.com/_agi_custom/digital-engineering/index.html?utm_source=google&utm_medium=cpc&utm_campaign=tme/agi--dme-search&utm_term=close-lifecycle-gaps&utm_content=20190722-webinars&gclid=EAlaIQobChMI7K214omJ5gIVleN3Ch0Z4wB5EAMYASAAEgKBe_D_BwE.
(Continued)

*Primary Examiner* — Chat C Do
*Assistant Examiner* — Bradford F Wheaton
(74) *Attorney, Agent, or Firm* — LeonardPatel PC

(57) ABSTRACT

A digital engineering (DE) platform configured to support space system development and acquisition. The DE platform includes a modular reference architecture models module configured to capture key modular system elements of interest using model-based system engineering (MBSE) and digital object oriented requirements system (DOORS) tools. The DE platform also includes a connectivity matrix module defining interface or specifications between one or more modular system elements. The DE platform is also configured to digitize the interface using a behavior model. The behavior model capturing required activity and/or sequence for a particular use case.

39 Claims, 35 Drawing Sheets

(51) Int. Cl.
  *G06F 9/54* (2006.01)
  *G06F 9/48* (2006.01)
  *G06F 9/445* (2018.01)
  *G06F 16/28* (2019.01)
(52) U.S. Cl.
  CPC ........ *G06F 16/2282* (2019.01); *G06F 16/289* (2019.01)
(58) Field of Classification Search
  USPC ........................................................ 717/140
  See application file for complete search history.

(56) References Cited

U.S. PATENT DOCUMENTS

| | | | | |
|---|---|---|---|---|
| 2010/0005386 | A1* | 1/2010 | Verma | G06F 40/289 715/237 |
| 2010/0205315 | A1* | 8/2010 | Xia | H04L 41/5054 709/228 |
| 2012/0151402 | A1* | 6/2012 | Durham | G06Q 10/067 715/772 |
| 2013/0073063 | A1* | 3/2013 | Kiffmeier | G05B 19/0426 700/86 |
| 2015/0045947 | A1* | 2/2015 | Yau | G06Q 20/3223 700/237 |
| 2015/0254330 | A1* | 9/2015 | Chan | G06F 11/3006 707/613 |
| 2017/0061659 | A1* | 3/2017 | Puri | G06F 16/23 |
| 2019/0114570 | A1* | 4/2019 | Prasad | G06Q 10/067 |

OTHER PUBLICATIONS

Australian National Digital Engineering Policy Principles, 2016.
Boley, H., and Chang, E., "Digital Ecosystems: Principles and Semantics", 2007 Inaugural IEEE International Conference on Digital Ecosystems and Technologies Caims, Australia, Feb. 2007.
Cameo-Data Hub Tutorial, URL: https://www.nomagic.com/files/manuals/CameoDataHubTutorial.pdf.
Creating a Framework for Digital Media Success: How media companies can use data to create a performance culture 2017 New Relic, Inc, URL: https://newrelic.com/resources/ebooks/media-application-kpis.
Daniel Nylen and Jonny Holmstrom, "Digital Innovation Strategy: A Framework for Diagnosing and Improving Digital Product and Service innovation", Business Horizon, Elsevier, 2015, 58, p. 57-67.
Department of Defense Architecture Framework, DODAF Version 2.0. URL https://dodcio.defense.gov/Portals/0/Documents/DODAF/DoDAF_v2-02_web.pdf.
Digital Engineering: The new growth engine for discrete manufacturers, Capgemini Digital Transformation Institute, URL: https://www.capgemini.com/wp-content/uploads/2018/06/DTI_Digital-Engineering201806122_V07.pdf.
Dong Ru-Ping and Yuan Li-Sheng, "Design and Implementation of Digital Engineering Accounting Management System," 2015 Seventh International Conference on Measuring Technology and Mechatronics Automation.
Geilson Loureiro, "A systems Engineering and Concurrent Engineering Framework for the Integrated Development of Complex Products", Doctoral Thesis, Loughborough University, 1999.
Hai Dong, Farookh Khadeer Hussain, Elizabeth Chang, "Exploring the Conceptual Model of Digital Ecosystem," Second International Conference on Digital Telecommunications (ICDT'07).
Industry 4.0: Building the digital enterprise, PWC, URL: https://www.pwc.com/gx/en/industries/industry-4.0.html.
Jeff A. Estefan, "Survey of Model-Based Systems Engineering (MBSE) Methodologies", INCOSE MBSE Focus Group, May 25, 2007.
Leslie Langnau, "Uncertainty Quantification (UQ) Benefits for a Digital Engineering Ecosystem", Accumold, Dec. 14, 2017, URL: https://www.3dcadworld.com/uncertainty-quantification-uq-benefits-digital-engineering-ecosystem/.
Majd Saleh, Marie-Helene Abel, "Moving from Digital Ecosystem to System of Information Systems," IEEE 20th International Conference on Computer Supported Cooperative Work in Design (CSCWD), May 2016, Nanchang, China, pp. 91-96.
Our Approach to Digital Engineering—A Fact Sheet, Panlogic, URL: www.panlogic.co.uk.
Paul T. Beery, "A Model-Based Systems Engineering Methodology for Employing Architecture in System Analysis Developing Simulation Models Using Systems Modeling Language Products to Link Architecture and Analysis", Dissertation, Naval Postgraduate School, Monterey, CA, Jun. 2016.
Rhapsody Gateway Add-On Software, URL: https://www.cdw.com/product/ibm-rational-rhapsody-gateway-add-on-software-subscription-and-support-re/2314646.
Sparx-EA Model Driven Generation (MDG), URL: https://sparxsystems.com.au/resources/mdg_tech/.
Wired, "Twitter Wins Patent for Twittering", URL: https://www.wired.com/2013/03/twitter-patents/.

* cited by examiner

800(a) Behavior Model

900(a) Behavior Model

| Component | Payload Requirement | Connectivity Matrix | I/F Requirement Section | I/F Requirements | Spacecraft BUS | Use Cases |
|---|---|---|---|---|---|---|
| CMBPS5 | Sub-System 5: Common P/L COMSEC/TRANSEC | Electrical I/F: 15538 cables with standard triax plug and/or Trompeter PL3455 connectors or resonable connectors, and RS-422 for serial TT&C data | | | C* Subsystem 2: Common Bus Tracking- Telemetry & Command SubSystem (TT&CS) | |
| CMBPs5C1_ PCOMSEC | Advanced Encyption Standard (AES) Decyptor and other Standards [PCOMSEC-1] | Yes. Output of Receiver demod connects to COMSEC decryptor. No standard for demod to decryptor is suggested because of fast innovations in decryption/encryption technology | 5.2.5.0-5 | • Electrical I/F shall be MIL-STD 1553B cables with standard triax plug and/or Trompeter PL3455 connectors or resonable connectors | CMBPs2C3_ TTCS | |
| | | | 5.2.5.0-6 | • Electrical I/F shall be RS-422 cables for serial TT&C data | CMBPs2C4_ TTCS | |
| CMBPs5C2_ PCOMSEC | AES Over-the-Air Rekey (OTAR) decryptor/encryptor [PCOMSEC-2] | Yes. Key is inputted through RX | 5.2.5.0-5 | • Electrical I/F shall be MIL-STD 1553B cables with standard triax plug and/or Trompeter PL3455 connectors or resonable connectors | CMBPs2C3_ TTCS | |
| | | | 5.2.5.0-6 | • Electrical I/F shall be RS-422 cables for serial TT&C data | CMBPs2C4_ TTCS | |
| CMBP57 | Sub-System 7: Common P/L C&DH SubSystem (CPC&DHS) | Some existing P/Ls do not have P/L C&DHS | | C* Subsystem 1: Common Bus Command and Data Bus Handing SubSystem (C&DHS) | | Use Case 5 |
| CMBPs7C4_ CPC&CHS | P/L Resource Management, Processing Unit (Managing Internal and External Bus Data [CPC&DHS-4] | Yes. 15538 | Common P/L C&DH SubSystem Connectivity (CPC&DHS- C5.2.7) | | CMBPs1C1_ CDHS | Use Case 5 |

| ID | Component | |
|----|-----------|---|
| 20 | CMBPs4C3_PFTS | Frequency Generation and Upconversion Unit (FG&UCU) (See note 3 below) [CPFTS-3] |
| 21 | CMBPS5 | Sub-System 5: Common P/L COMSEC-TRANSEC |
| 22 | CMBPs5C1_PCOMSEC | Advanced Encryption Standard (AES) Decryptor and other Standards [PCOMSEC-1] |
| 23 | CMBPs5C2_PCOMSEC | AES Over-the Air Rekey (OTAR) Decryptor/Encryptor [PCOMSEC-2] |
| 24 | CMBPs5C3_PCOMSEC | AES Encryptor and other Standards [PCOMSEC-3] |
| 25 | CMBPs5C4_PCOMSEC | Randomizer [PCOMSEC-4] |
| 26 | CMBPs5C5_PCOMSEC | PROM (Programmable Read Only Memory) [PCOMSEC-5] |
| 27 | CMBPS6 | Sub-System 6: Common P/L TT&C SubSystem (CPTT&CS) |
| 28 | CMBPs6C1_CPTT&CS | PPT&C Antenna Assembly for S-Band/L-Band [CPTT&CS-1] |
| 29 | CMBPs6C2_PCOMSEC | PPT&C RF Front-End Assembly [CPTT&CS-2] |
| 30 | CMBPs6C3_PCOMSEC | P/L Unified S-Band (USB) RX/TX Assembly [CPTT&CS-3] |
| 31 | CMBPs6C4_PCOMSEC | P/L SGLS L-Band (USB) RX/TX Assembly [CPTT&CS-4] |
| 32 | CMBPs6C5_PCOMSEC | GPS Receiver Assembly (Optional) [CPTT&CS-5] |
| 33 | CMBPS7 | Sub-System 7: Common P/L C&DH SubSystem (CPC&DHS) |
| 34 | CMBPs7C1_CPC&DHS | P/L Command Authentication Processing Unit (Sync Word Frame Lock, Unparse Command) [CPC&DHS-1] |
| 35 | CMBPs7C2_CPC&DHS | P/L System Timing Unit [CPC&DHS-2] |
| 36 | CMBPs7C3_CPC&DHS | P/L Fault Management Processing Unit (Execute Stored CMD Sequence, Moniter System Health) [CPC&DHS-3] |

| ID | Connectivity Matrix |
|----|---------------------|
| 10 | Yes. Output of Receiver demod connects to COMSEC decryptor. No standard for demod to decryptor is suggested because of fast innovations in decryption/encryption technology. |
| 11 | No. |
| 12 | Yes. Key is inputted through RX |
| 13 | Yes. Encryptor connects to input of TX modulator. No standard for encryptor to mod suggested because of fast innovations in decryption/encryption technology. |
| 14 | No Interface |
| 15 | N/A Some Existing P/Ls do not have P/L C&DHS |
| 19 | N/A Exception if someday the TT&C uses Direct Sequence Spread Spectrum. RS-422 |
| 20 | Possibly for the SGLS Waveform and data. RS-422 |
| 21 | Possibly for GPS timing. RS-422 |
| 22 | Yes. Electrical I/F: 1553B |
| 23 | Yes. 1553B |
| 24 | Possibly. Compare configuration with that in memory. |
| 25 | Yes. 1553B |
| 26 | Yes. Mechanical I/F |
| 27 | Yes. Mechanical |
| 16 | Possibly. TT&C Antenna Assembly for S-Band/L-Band could include RF switches where is necessary to get the command from the C&DHS-1 command authentication over to the switch to change switch routing. Electrical I/F: 1553B. |
| 17 | Connectivity. Authenticated command goes over to the TT&C RF Front-End Assembly to say switch to redundant path. |

| ID | Spacecraft BUS |
|---|---|
| 6 | CMBSs1C5_CDHS |
| 9 | CB Subsystem 2: Common Bus Tracking & Command SubSystem (TT&CS) |
| 10 | CMBSs2C1_TTCS |
| 11 | CMBSs2C2_TTCS |
| 12 | CMBSs2C3_TTCS |
| 13 | CMBSs2C4_TTCS |
| 56 | CMBSs2C5_TTCS |
| 14 | CB Subsystem 2: Common Bus Electrical Power SubSystem (EPS) |
| 15 | CMBSs3C1_TTCS |
| 16 | CMBSs3C2_TTCS |
| 17 | CMBSs3C3_TTCS |
| 18 | CMBSs3C4_TTCS |
| 19 | CMBSs3C5_TTCS |
| 20 | CMBSs3C6_TTCS |
| 57 | CMBSs3C7_TTCS |
| 21 | CB Subsystem 2: Common Bus Thermal Control SubSystem (TCS) |
| 22 | CMBSs4C2_TCS |

| ID | Modular PL-to-Bus Standard IF Spec-V5_export | Object Number |
|---|---|---|
| 2133 | • TBD. | 5.2.4.0-18 |
| 2134 | 5.2.5 Common P/L COMSEC-TRANSEC Connectivity (CPCOMSEC-TRANSEC) | 5.2.5 |
| 2135 | • CPCOMSEC-TRANSEC-C-E-I/F#1: Describes the electrical interface between the CPCOMSEC-TRANSEC and the spacecraft Bus C&DHS | 5.2.5.0-1 |
| 2136 | • Electrical I/F shall be MIL_STD 1553B cables with standard triax plug and/or Trompeter PL3455 connectors or reasonable connectors. | 5.2.5.0-2 |
| 2137 | • Electrical I/F shall be RS-422 cables for serial TT&C data | 5.2.5.0-3 |
| 2138 | • CPCOMSEC-TRANSEC-C-E-I/F#2: Describes the electrical interface between the CPCOMSEC-TRANSEC and the spacecraft Bus TT&CS | 5.2.5.0-4 |
| 2139 | • Electrical I/F shall be MIL_STD 1553B cables with standard triax plug and/or Trompeter PL3455 connectors or reasonable connectors. | 5.2.5.0-5 |
| 2140 | • CPCOMSEC-TRANSEC-C-E-I/F#3: Describes the electrical interface between the CPCOMSEC-TRANSEC and the spacecraft Bus TT&CS | 5.2.5.0-6 |
| 2141 | • Electrical I/F shall be RS-422 cables for serial TT&CS | 5.2.5.0-7 |
| 2142 | • Spacecraft bus shall provide 100, 70, or 28V regulated or unregulated power | 5.2.5.0-8 |
| 2143 | • The return power lines shall be standard TTS power cables with shielding | 5.2.5.0-9 |

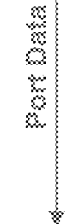
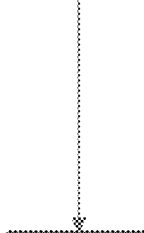

Custom Design Data Porting Model Using Existing Aerospace Huddle

MBSE Tool

Port Data

*Aerospace Huddle Plugin Middleware*
Key Features
- One-to-one plugins allowing for the ability to generate text-based DOORS modules that mirror the MBSE model structure.
- Provide Python processing as an alternative option that would be able to convert ported MBSE files (CSV, XML, etc.) into CSVs that mirror the MBSE model's ontology.
- Allow standardization of information and upload into DOORS models.
- Monitor data
- Synchronize data IBM-DOORS Modular Database Model

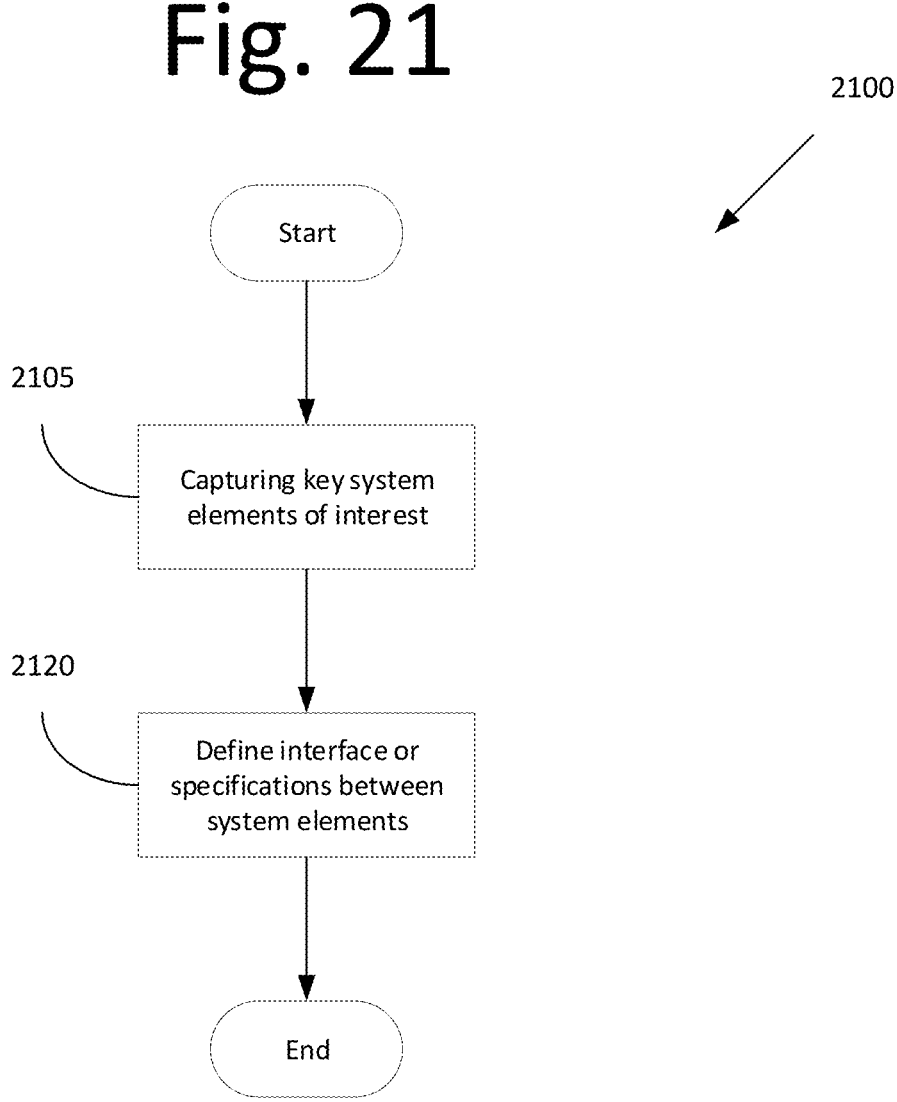

DIGITAL ENGINEERING PLATFORM CONFIGURED TO SUPPORT FUTURE SPACE SYSTEMS DEVELOPMENT AND ACQUISITION

FIELD

The present invention relates to digital engineering (DE) platform to support future space systems development and acquisition.

BACKGROUND

Current DE platforms provided by existing model-based system engineering (MBSE) developers, including IBM-Rhapsody, No-Magic-Cameo, and Sparx-EA, are stove-pipe DE platform solutions. The solutions require specific "plug-in" software components for the MBSE models to "talk" with the databases implemented in the requirements database tool, such as standard IBM-DOORS or IBM-DWA or IBM-NGD. For example, the plug-in software component allowing a No-Magic-Cameo MBSE model to talk seamlessly with the standard IBM-DOORS is the Cameo-Data-Hub. For IBM-Rhapsody MBSE models, the plug-in is IBM-Jazz/Open Services for Lifecycle Collaboration (OSLC). Similarly, for Sparx-EA MBSE models, the plug-in is Model Driven Generation (MDG). Some of the current DE platforms also use typical MBSE techniques such as IBM's Rational Integrated Systems Development, NASA State Analysis MBSE, INCOSE Object Oriented System Engineering, Dori Object-Process, and MBSE Architecture in System Analysis. Recently, The Aerospace Corporation® has also developed Huddle™ ecosystem that is similar to IBM-Jazz/OSLC but focusing on existing Aerospace Corporation® tools and databases. The capability features associated with these current DE platforms include (i) Linkage of Model Artifacts to System Engineering Process Steps, (ii) State Based Control Architecture, (iii) Modeling the behavior of state variables & relationships among them, including information about HW interfaces & operation, (iv) Suitable for Space System Architecture Analysis, (v) Enforcing consistency within space architecture models through well-defined ontologies and metadata models, and (vi) Suitable for utilization as a mechanism for conducting detailed performance analysis of large scale, complex space systems. However, these current capabilities do not address the potential seven-challenge identified for the future space systems development and acquisition. These seven challenges include: (i) flexible MBSE technique for modeling of any mission types of future space systems, (ii) robust and agile MBSE technique for modeling of any interface types among the spacecraft Bus subsystems and mission Payload (PL) subsystems, and between space Bus and mission PL, (iii) flexible, robust and agile MBSE technique for digitizing space system requirements, interface specs among spacecraft Bus subsystems, interface specs among mission PL subsystems, and interface specs between spacecraft Bus subsystems and mission PL, (iv) robust and agile DOORS technique for automatic update and refresh requirements and spec databases (Source of Truth), (v) integration of disparate DE space system models using different MBSE tools, (vi) combined flexible, robust and agile MBSE and DOORS approach for performing automatic requirements traceability, and (vii) combined flexible, robust and agile MBSE and DOORS approach for performing automatic contractors' requirements/specification Verification & Validation (V&V).

Accordingly, an approach introducing innovative DE approach to combine MBSE and DOORS techniques for connecting disparate DE models, defining/controlling system interfaces and defining/managing interface baseline specifications within a DE construct.

SUMMARY

Certain embodiments of the present invention can provide potential solutions to the problems and needs in the current state-of-the art that have not yet been fully identified, appreciated, or solved by existing technologies. Some embodiments generally pertain to combine MBSE and DOORS techniques for connecting disparate DE models, defining/controlling system interfaces and defining/managing interface baseline specifications within a DE construct. The approach includes a proposed flexible, robust, and agile DE platform and associated digital implementation framework of processes, tools, digital models, digital threads and digital use cases to address the above-mentioned seven challenges associated with the future space systems development and acquisition.

In an embodiment, the DE platform employs flexible, robust and agile modeling techniques by combining software tools, such as MBSE No-Magic Cameo tool, Excel Sheets, IBM standard DOORS, No-Magic-Cameo and CSV files, to address the above-mentioned seven challenges. The DE platform is: (i) suitable for developing any MBSE models for future space system architecture for any mission type, (ii) suitable for providing any interface type between SC Bus and mission PL through a newly proposed connectivity matrix, (iii) suitable for digitizing system requirements ("reqs") and interface specifications ("specs"), (iv) suitable for automatic update and refresh requirements and spec databases (Source of Truth), (v) MBSE tool agnostic for connecting disparate DE models using different MBSE tools, (vi) suitable for performing automatic requirements traceability, and (vii) suitable for performing automatic suppliers/contractors' requirements/specification and V&V (Verification & Validation).

In some embodiments, a DE platform configured to support space system development and acquisition. The DE platform includes a reference architecture models module configured to capture key system elements of interest using MBSE and DOORS tools. The DE platform also includes a connectivity matrix module defining interface or specifications between one or more system elements. The DE platform is also configured to digitize the interface using a behavior model. The behavior model capturing required activity and/or sequence for a particular use case.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7A is a chart illustrating a Connectivity Matrix (CoMax) for electrical interfaces between a MoPRA and MoBRA, according to an embodiment of the present invention.

FIGS. 12A-12F are illustrations showing how information contained in the separate database and architecture modules implemented in IBM-DOORS are brought together in a single trace report, according to an embodiment of the present invention.

FIG. 17 is a diagram illustrating a custom design data porting model using existing Aerospace Huddle™ plugin middleware, according to an embodiment of the present invention.

FIG. 21 is a flow diagram illustrating a method for configuring and executing a digital engineering platform to support space system development and acquisition, according to an embodiment of the present invention.

DETAILED DESCRIPTION OF THE EMBODIMENTS

Some embodiments generally pertain to a flexible, robust, and agile digital engineering platform (hereinafter the "platform" "FADE" platform, or "DE" platform) supporting future space systems development and acquisition. Some embodiments utilize software tools such as MBSE No-Magic Cameo tool, Excel Sheets, IBM standard DOORS, No-Magic-Cameo and CSV files.

Platform and Framework

At a high-level, the basic framework and implementation approach of the platform (see FIGS. 1A and 1B) includes five components, each of which are intended to mitigate real life challenges of implementing DE in a larger enterprise. For example, Component 1 includes reference architecture models, Component 2 includes connectivity matrixes that define interface (or specifications) between key system elements, Component 3 includes use cases for MBSE behavior model development, Component 4 includes a modular database of specifications defining subsystem elements and interfaces, and Component 5 includes data porting for data transfer between specification database tool and MBSE tool(s).

Figure 1A:
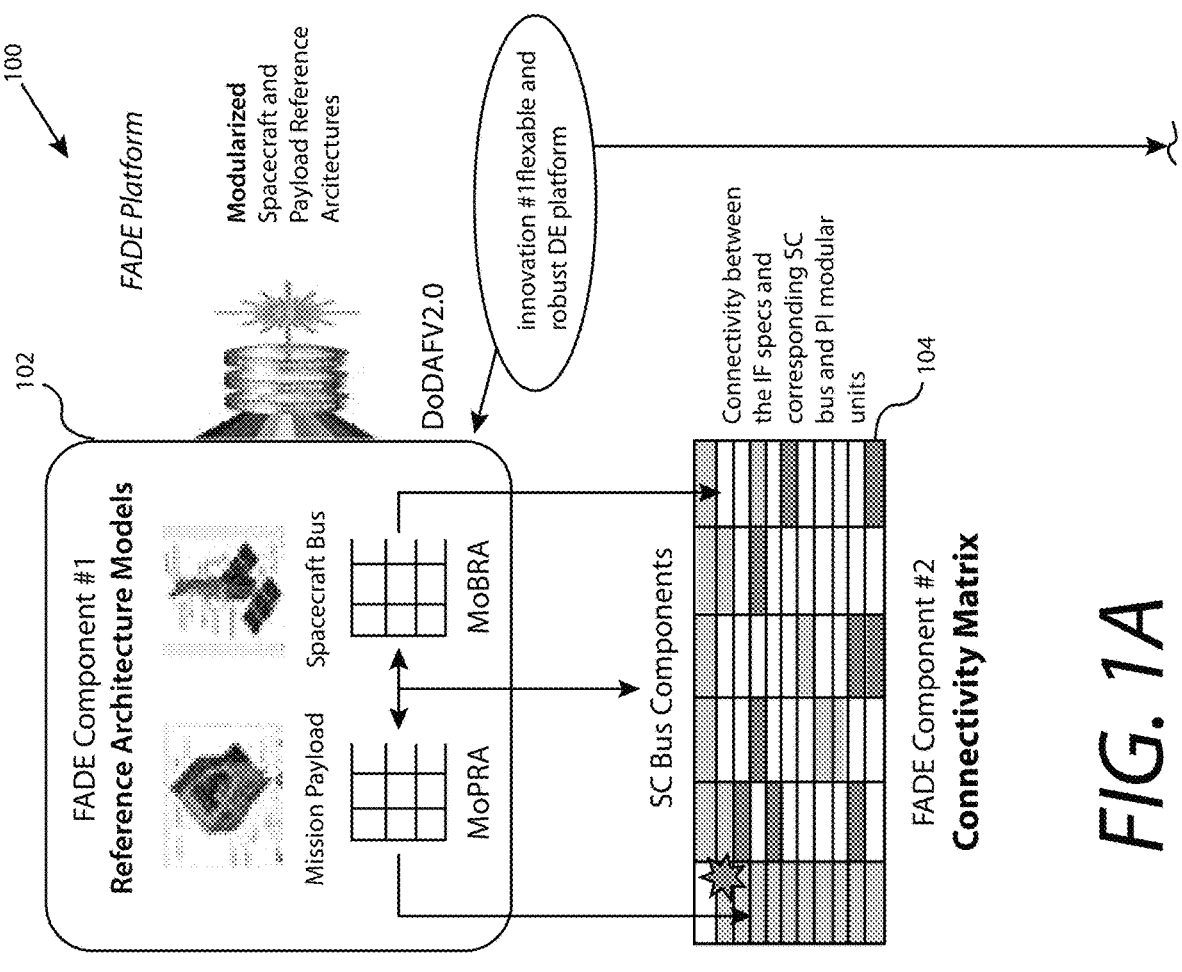
FIGS. 1A and 1B are diagrams illustrating DE platform, according to an embodiment of the present invention.
Figure 1B:
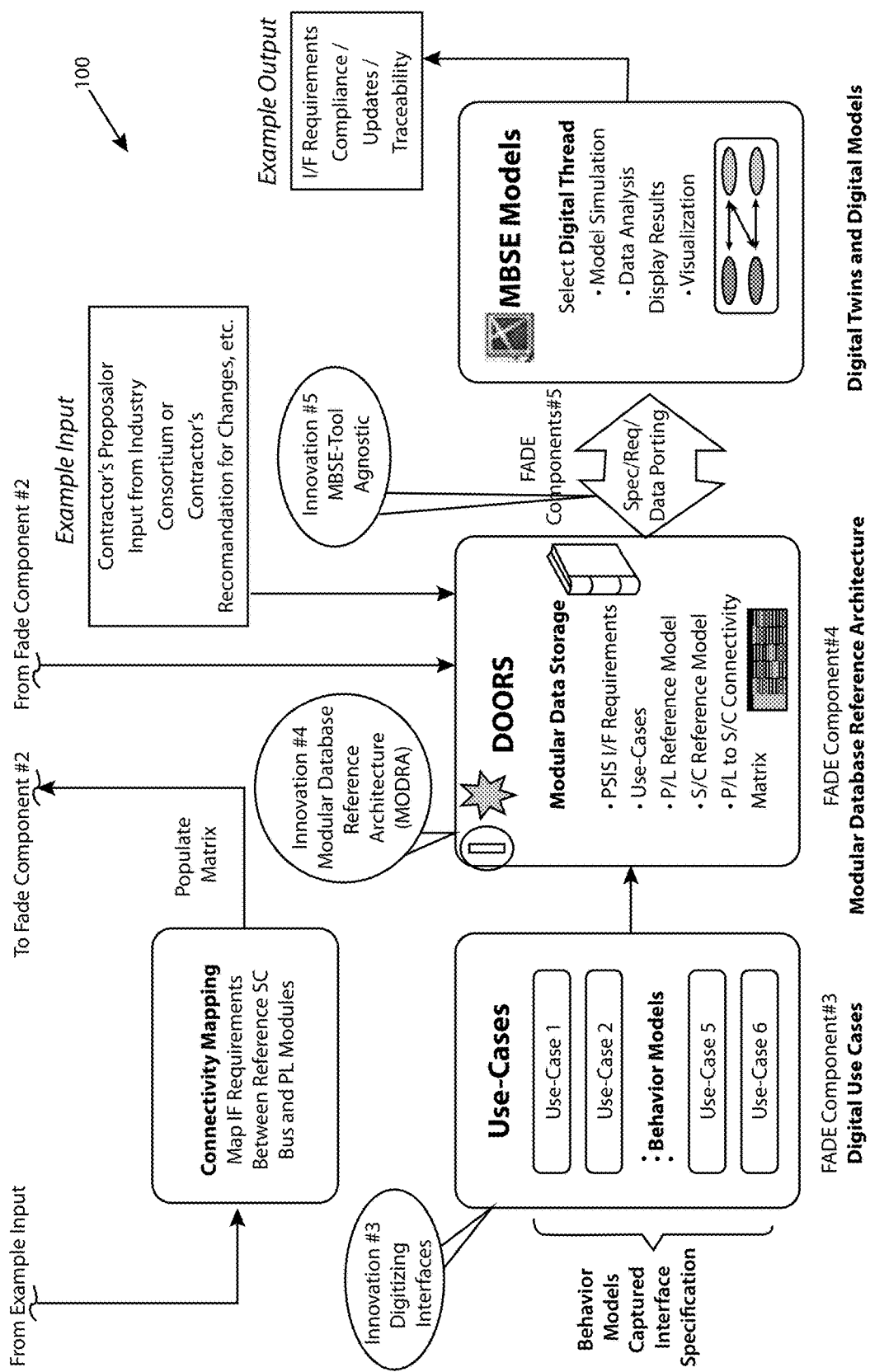

FIGS. 1A and 1B are diagrams illustrating platform 100, according to an embodiment of the present invention.

Component 1—Reference Architecture Models

Figure 2:
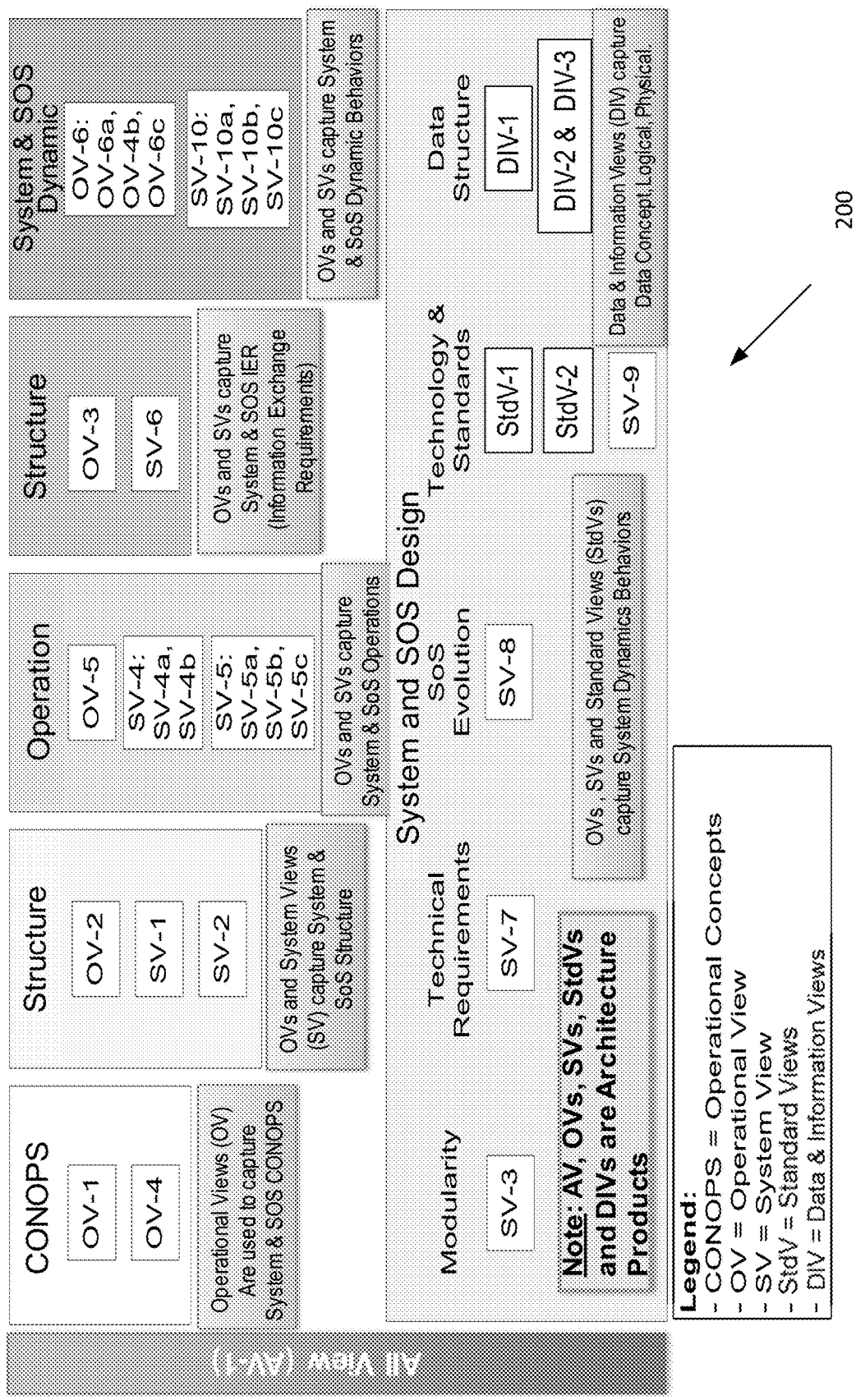
FIG. 2 is a diagram illustrating an architecture approach using DODAF V 2.02 (Department of Defense Architecture Framework Version 2.02), according to an embodiment of the present invention.

In the first component, reference architecture models 102 capture key system elements of interest using MBSE and IBM-DOORS tools. In certain embodiments, modeling is based on Department of Defense (DoD) Architecture Framework (DoDAF) V2.02 and Modular Open Architecture Approach (MOSA), collectively establishing an industry-standard ontology for metadata models. Certain embodiments involve modular spacecraft (SC) Bus and mission PL models developed using DoDAF artifacts. See, for example, FIG. 2 is a diagram illustrating an architecture approach 200 using DODAF V 2.02, according to an embodiment of the present invention.

Architecture approach 200 using DODAF V 2.02 proposes to capture reference architecture models using six view-points—All Viewpoint (AV), Capability Viewpoint (CV), Operations Viewpoint (OV), Systems Viewpoint (SV), Standards Viewpont (StdV), and Data and Information Viewpoint (DIV). AV, for example, describes the overarching aspects of architecture context that relate to all viewpoints. CV describes capability requirements, the delivery timing, and the deployed capability. OV describes operational scenarios, activities, and requirements that support capabilities. SV—for Legacy support—describes the design for solutions articulating the systems, their composition, interconnectivity, and context providing for or supporting operational and capability functions. StdV describes the applicable operational, business, technical, and industry policies, standards, guidance, constraints, and forecasts that apply to capability and operational requirements, system engineering processes, and systems. DIV describes data relationships and alignment structures in the architecture content for the capability & operational requirements, system engineering processes, and systems & services.

For each view-point, architecture approach 200 proposes a set of architecture artifacts (e.g., OV-1, OV-2, OV3, OV-4, OV-5, etc.) that provides a systematic way of describing a system architecture consistently in a System-of-Systems (SOS) environment. For examples, architecture approach 200 of FIG. 2, OV-1 and OV-4 capture a system or a SOS CONOPS; OV-2, SV-1 and SV-2 capture system or a SOS design structure; OV-5, SV-4, SV-4a, SV-4b, SV-5a, SV-5b and SV-5c capture system or SOS operations; and OV-3 and SV-6 capture system or a SOS Information Exchange Requirements (IER).

Figure 3A:
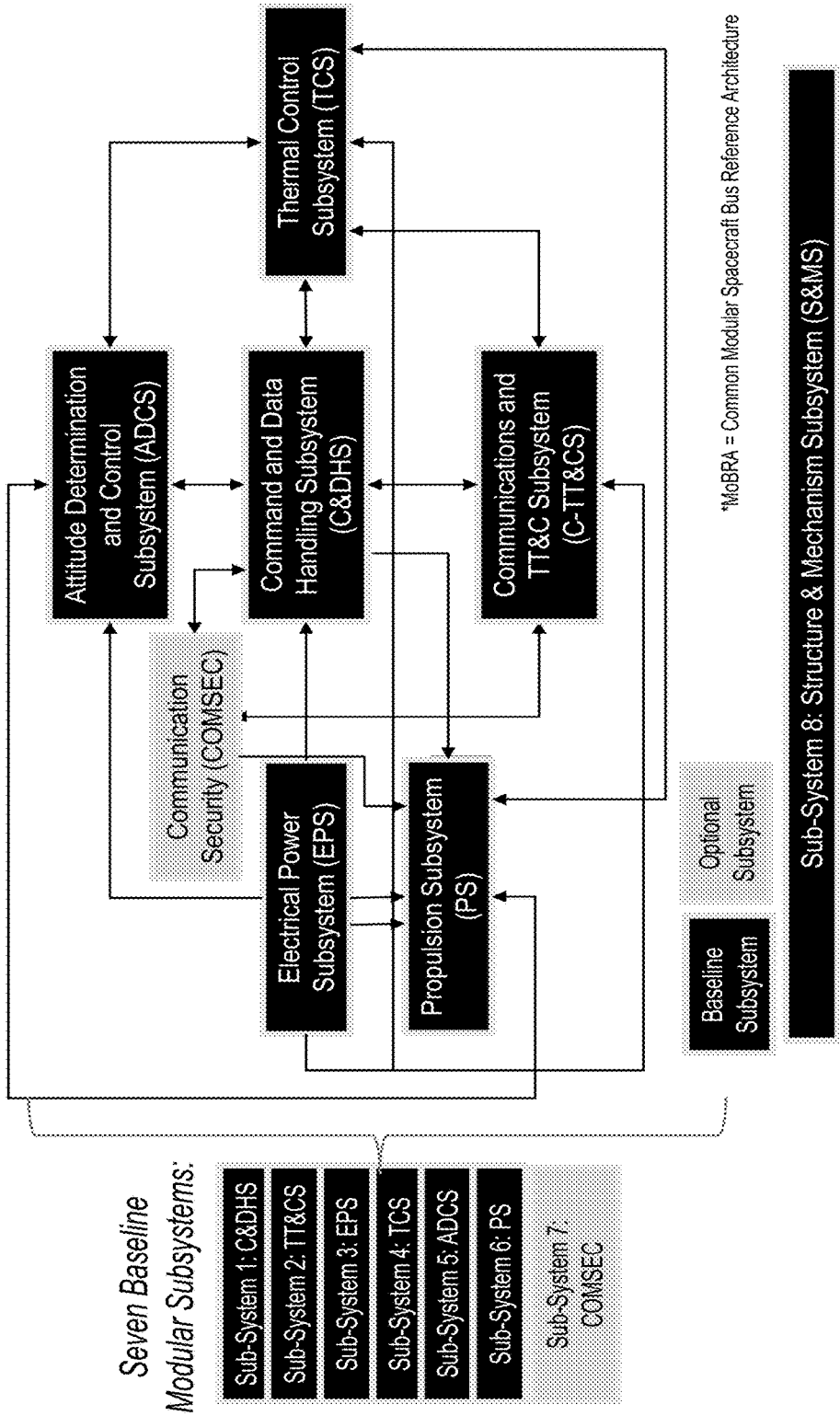
FIG. 3A illustrates a common MoBRA (Modular Bus Reference Architecture), which was derived based on a survey of military, civil, and commercial SC Bus, according to an embodiment of present invention.
Figure 3B:
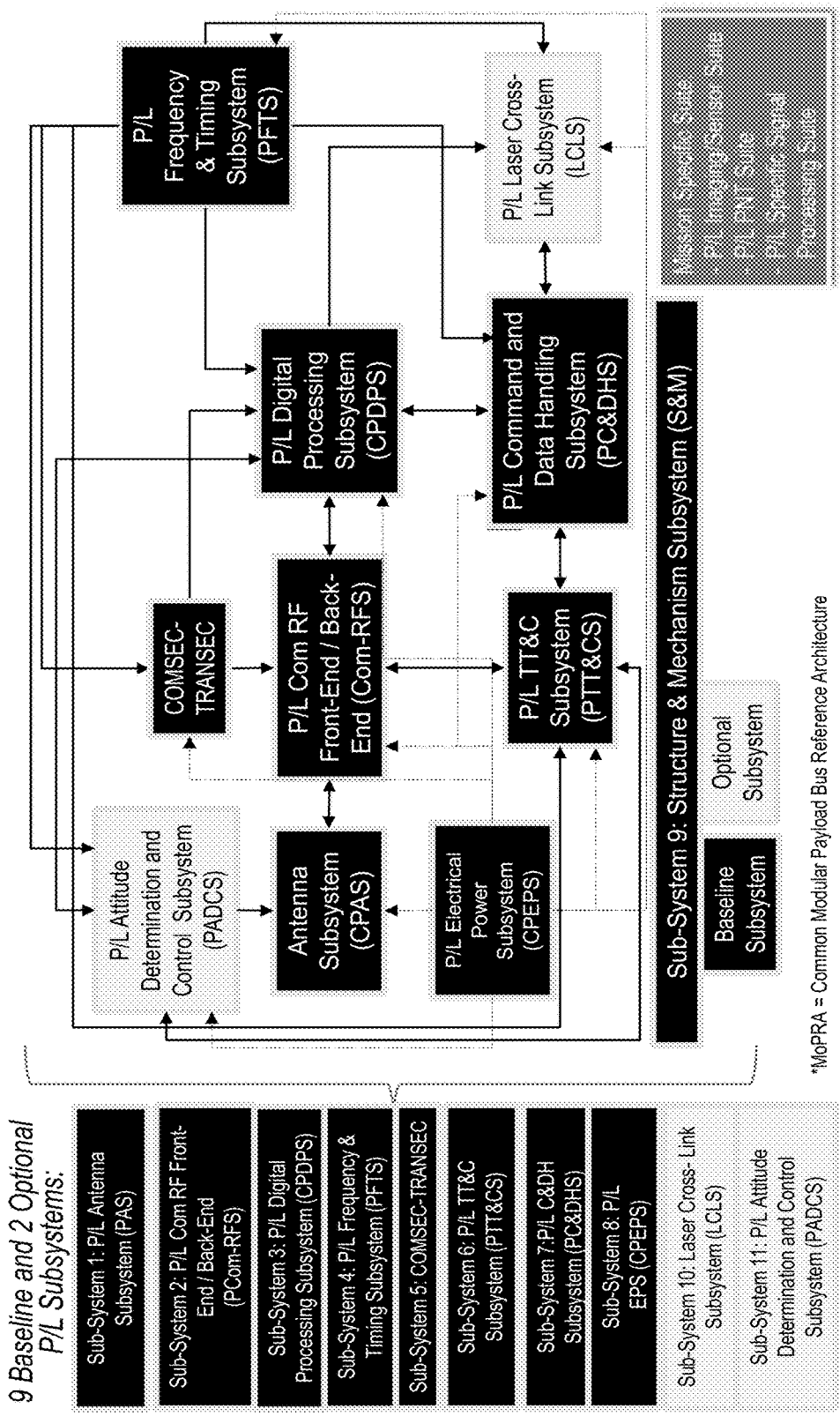
FIG. 3B illustrates a MoPRA (Modular Payload Reference Architecture), which was also derived based on a survey of existing military, civil, and commercial mission PLs (Payloads), according to an embodiment of present invention.

FIGS. 3A and 3B are diagrams illustrating a common Modular SC Bus Reference Architecture (MoBRA) 300(a) and Modular PL Reference Architecture (MoPRA) 300(b), according to an embodiment of the present invention.

FIG. 3A illustrates common MoBRA 300A, which was derived based on a survey of military, civil, and commercial SC Bus. The current MoBRA has seven baseline modular subsystems. In MoBRA, the Communication Security (COMSEC) is separated from the Tracking, Telemetry & Command Subsystem (TT&CS), increasing the total number of baseline SC Bus components from seven to eight subsystems with the $8^{th}$ subsystem being denoted as the SC Bus Structure & Mechanism Subsystem (S&MS). The separation of COMSEC from the TT&CS allows the system modeler to update and refresh the COMSEC as the threats are changing frequently without impacting the TT&CS. MoBRA 300(a) also shows high-level connectivity among SC Bus baseline subsystem components, and they are implemented in MBSE tool using DODAF V2.02 architecture views.

Turning to FIG. 3B, this figure illustrates MoPRA 300(b), which was also derived based on a survey of existing military, civil, and commercial mission PLs. A typical MoPRA includes 9 baseline PL subsystems. In MoPRA, two optional mission PL subsystems are being proposed, namely, Laser Cross-Link Subsystem (LCS) and PL Altitude Determination and Control Subsystem (PADCS). In this illustration, the total number of baseline mission PL subsystem components increases from nine to eleven subsystems with the $9^{th}$ subsystem being denoted as the Mission PL Structure & Mechanism Subsystem (PS&MS). The MoPRA 300(b) also shows high-level connectivity among mission PL subsystems, and they are implemented in MBSE tool using DODAF V2.02 architecture views.

Figure 4A:
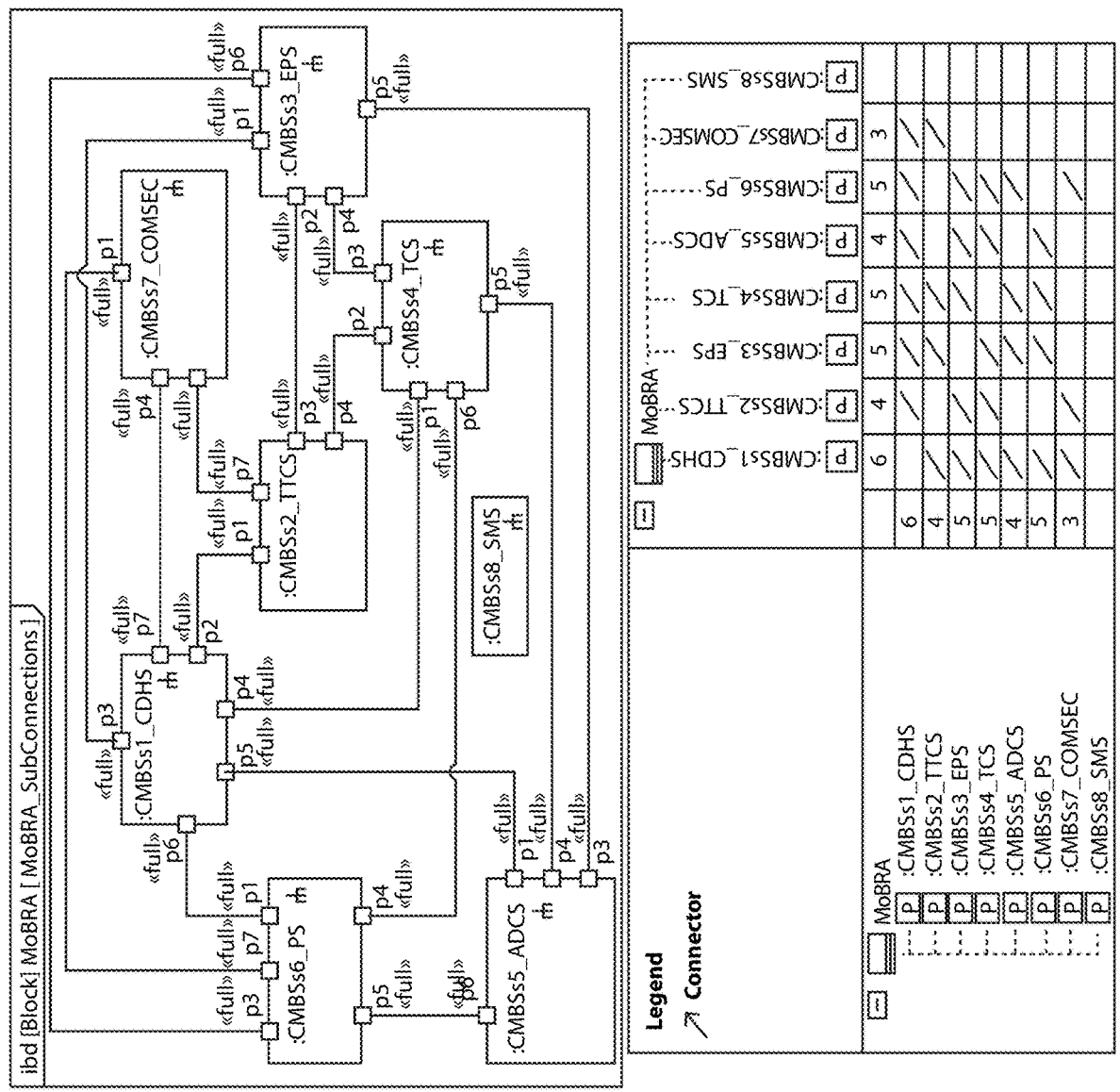
FIGS. 4A and 4B are diagrams illustrating an implementation of common MoBRA and MoPRA solutions and associated internal Bus and PL interfaces in no-magic-cameo MBSE tool using DODAF 2.02 views, according to an embodiment of the present invention.
Figure 4B:
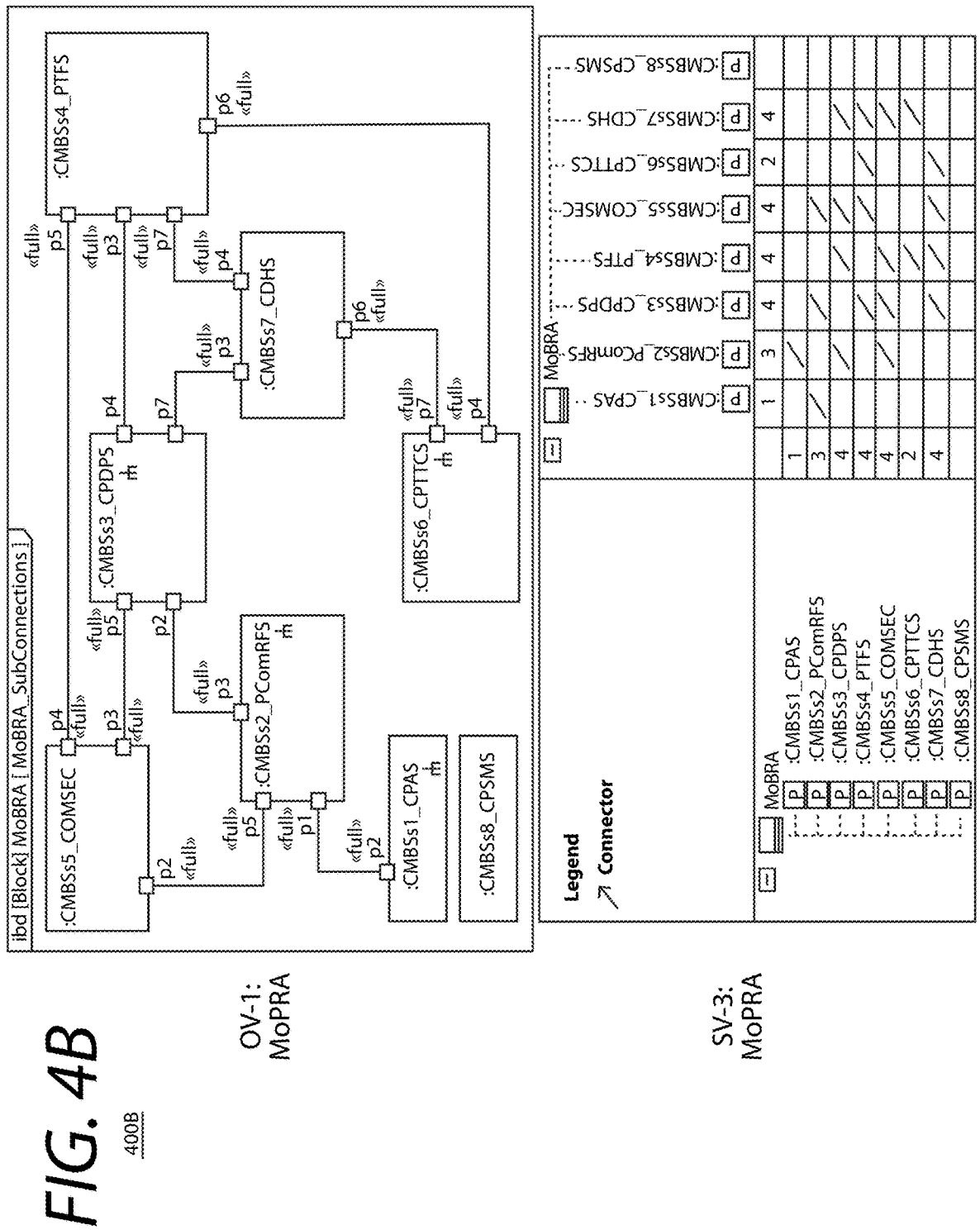

FIGS. 4A and 4B are diagrams illustrating implementations 400A and 400B of common MoBRA and MoPRA solutions and associated internal Bus and PL interfaces in no-magic-cameo MBSE tool using DODAF 2.02 views, according to an embodiment of the present invention. In an embodiment, FIGS. 4A and 4B depict DODAF OV-1 for MoBRA 400A and MoPRA 400B, and DODAF SV-3 for MoBRA and MoPRA. OV-1 MoBRA and MoPRA are captured in MBSE models for the purpose of supporting the requirement verifications, updates, and traceability. Further, OV-1 MoBRA and MoPRA provide the foundation for the DE infrastructure.

Figure 5:
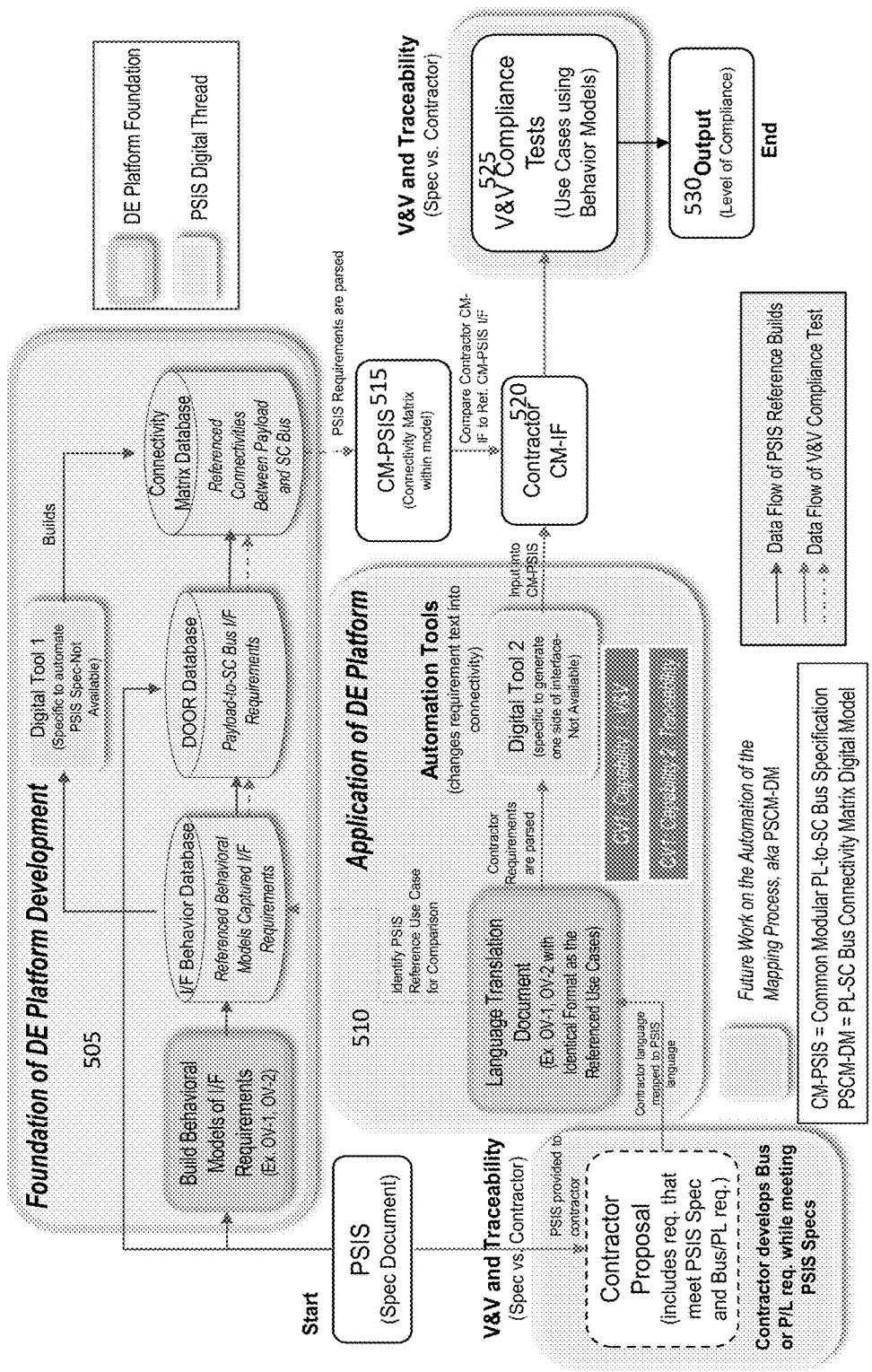
FIG. 5 is a diagram illustrating an implementation of the DE platform and a digital thread for payload-to-SC Bus interface standard (PSIS) compliance V&V, according to an embodiment of the present invention.
Figure 6:
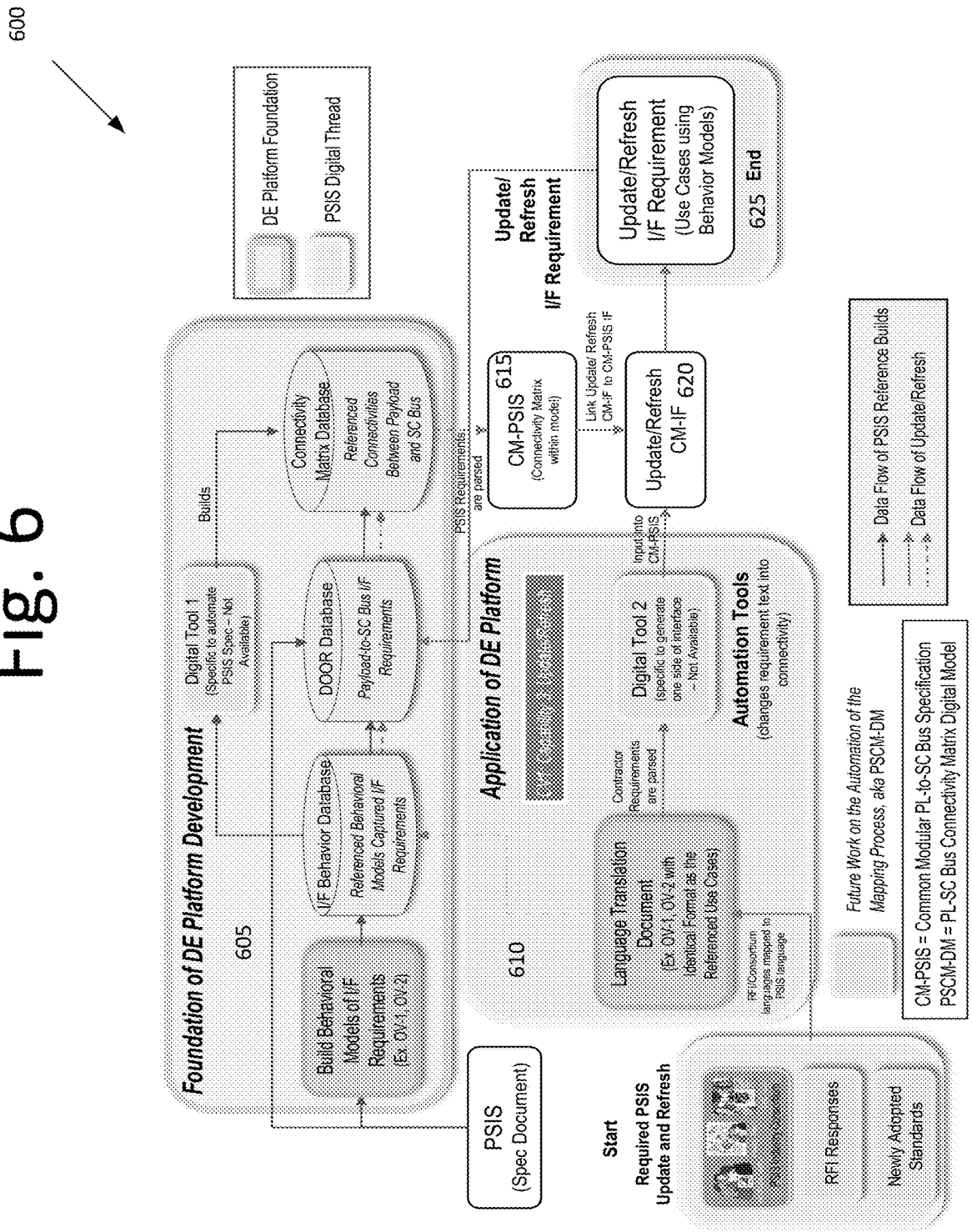
FIG. 6 is a diagram illustrating an implementation of the DE platform and a digital thread for PSIS update and refresh, according to an embodiment of the present invention.

FIG. 5 is a diagram illustrating an implementation 500 of the DE platform and a digital thread for PSIS compliance V&V, according to an embodiment of the present invention. FIG. 6 is a diagram illustrating an implementation 600 of the DE platform and a digital thread for PSIS update and refresh, according to an embodiment of the present invention. Both FIGS. 5 and 6 show the DE implementation approach for the foundation of the DE platform and sample digital threads. Further, FIGS. 5 and 6 show how the DE platform is used for assessing the two sample digital threads for the PSIS use case. For example, in FIG. 5, a government reference specification document is provided to DE platform development 505. DE platform development 505 then performs digitization of the government reference specification document. A specification document from contractor is provided to application of DE platform 510. The contractor may be a selected contractor, in some embodiments. Application of DE platform 510 then digitizes and translates the contractor document into the same format as the government reference specification document. The government reference specification (e.g., PSIS) is parsed by connectivity matrix module 515 and translated into the connectivity matrix within the model. The digitized contractor specification document is also translated into a contactor connectivity matrix (CM) interface (IF) at 520. Module 525 (V&V Compliance Tests) compares the government reference connectivity matrix with the contractor connectivity matrix for compliance test, and an output module 530 outputs the results of the comparison. The output may provide the level of compliance by the contractor specification.

FIG. 6 is a diagram illustrating an implementation 600 of a DE platform and a digital thread for update and refresh of the interface requirements, according to an embodiment of the present invention. In FIG. 6, government reference specification document (e.g., PSIS) is provided to DE platform development 605 for digitization. Application of DE platform 610 receives a request for information (RFI) responses from a contractor, which may be a selected contractor. In the request, the contractor proposes new adopted standard(s) to their specification. The request includes contractor updated documents, which are digitized and translated into the same format as the government reference specification document. The digitizing and translation is performed by Application of DE platform 610.

CM-PSIS 615 then parses the reference government specification document (e.g., PSIS) into a connectivity matrix within a model. Similarly, the digitized updated contractor specification document is translated into contractor CM interface (IF) at 620. The update/refresh module 625 compares the government reference CM with the contractor CM for identification of the required updates and refresh. The update and refresh interface requirements may then be provided to DOORS data.

Component 2—Connectivity Matrix (CoMax) Component

Figure 7A:
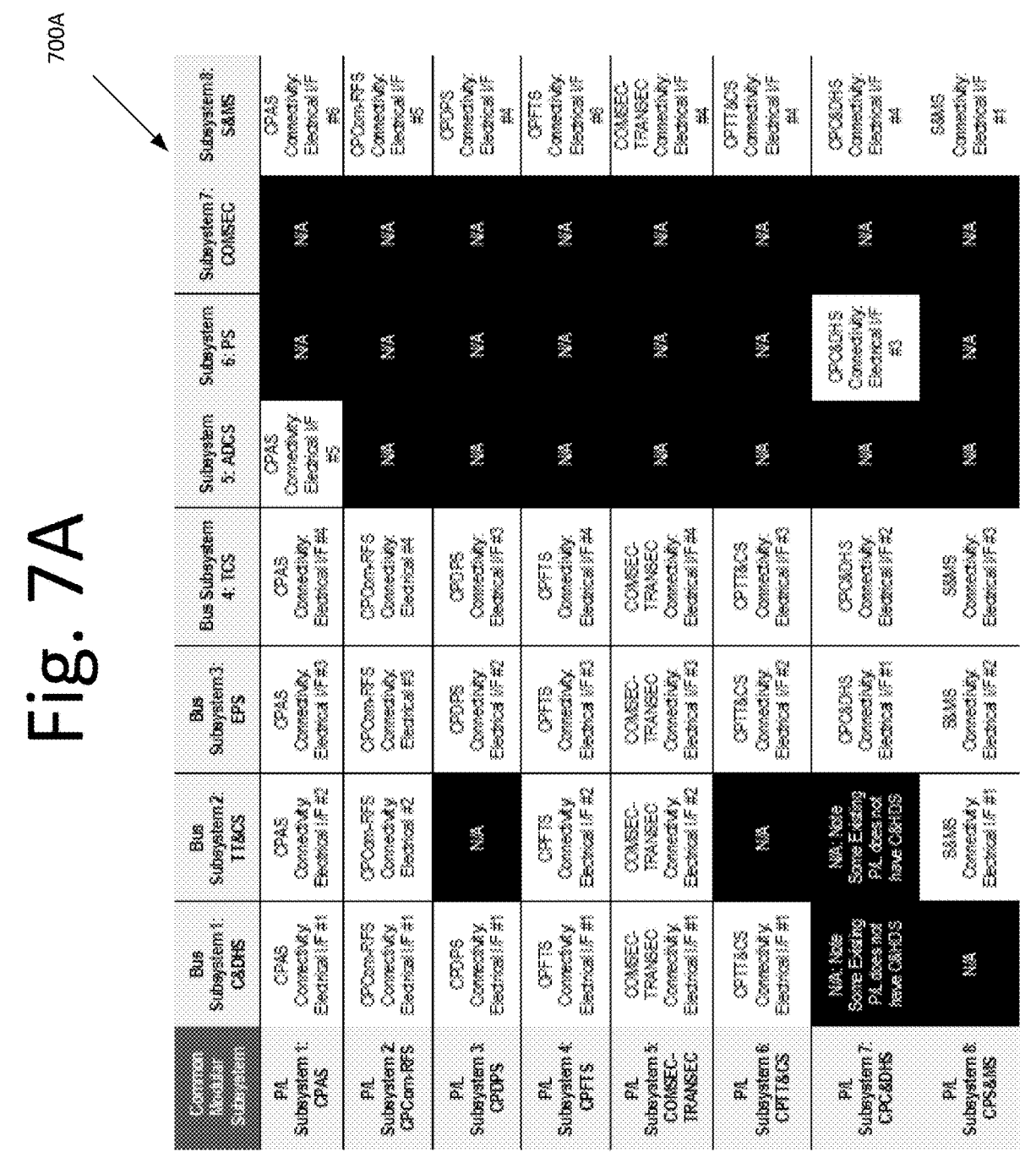

Before component 2 is explained below, it should be appreciated that connectivity matrix may be referred to as CM or CoMax. Now, continuing with component 2, CoMax 104 may define and manage the interface between two system or subsystem elements. For example, FIG. 7A is a chart 700A illustrating a CoMax for electrical interfaces between a MoPRA and MoBRA, according to an embodiment of the present invention. Specifically, in FIG. 7A, a notional CoMax for an electrical interface between a common modular SC Bus and a mission PL is shown. The first column represents the common modular mission PL subsystem components, and the first row represents the common modular SC Bus subsystem components. For this example, the intersection of the row and column represents the interface spec between the mission PL subsystem component and SC Bus subsystem component. In one example, the PL Subsystem 1 component (CPAS) is connected to SC Bus Subsystem 1 component (C&DHS) through electrical interface (I/F) specification #1. The "Black" boxes show a lack of connectivity among those subsystem components. As an example, PL Subsystem 3 component (CPDPS) does not have a connection with the SC Bus Subsystem 2 component (TT&CS). A CoMax for different interface type between the mission PL and SC Bus can be constructed using the same spreadsheet. Similarly, a CoMax for internal SC Bus (or mission PL) that need to remain easy and open to modification and redefinition.

Figures 1, 7B:
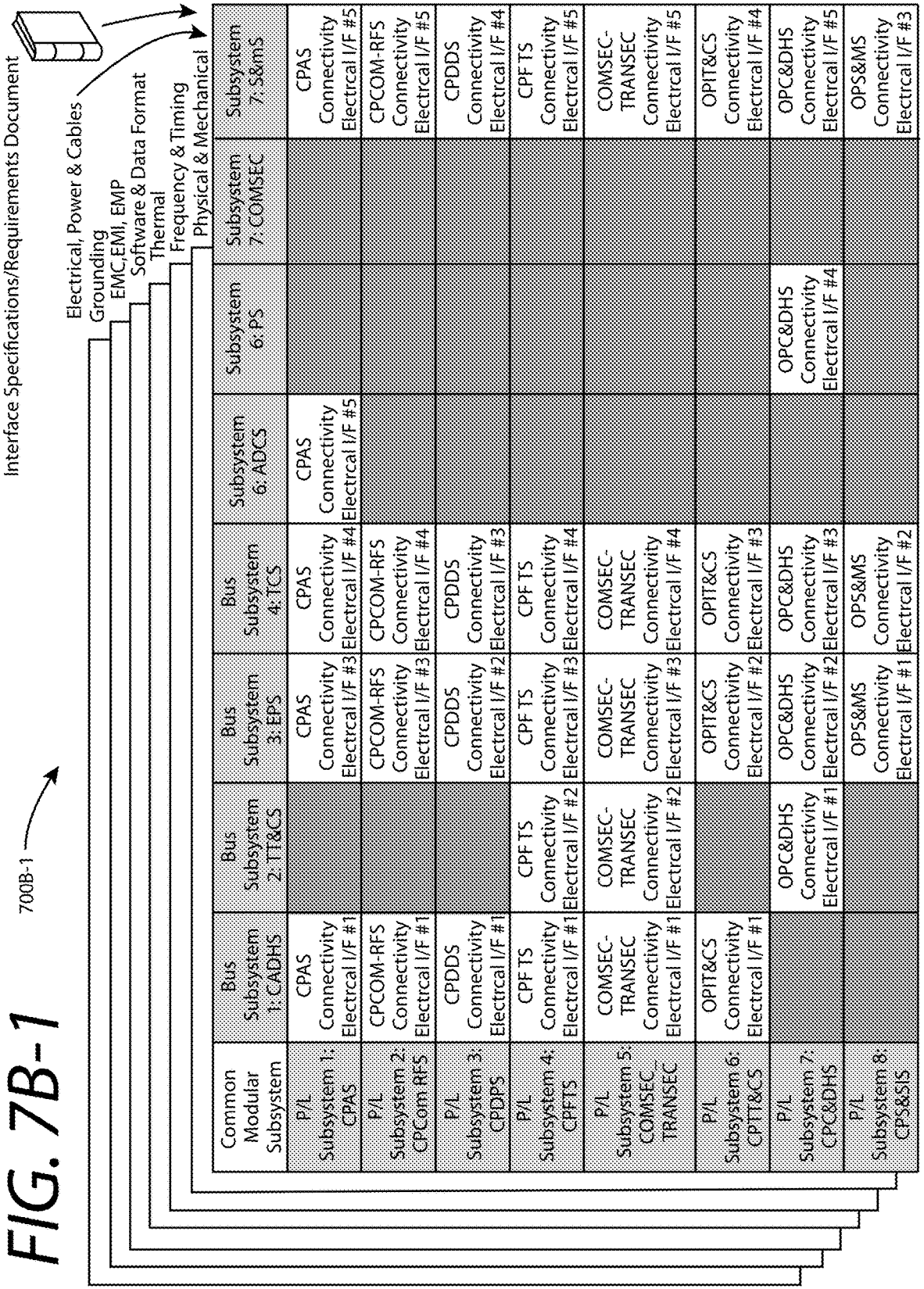
FIG. 7B-1 to 7B-3 are diagrams illustrating an example of the use of CoMax to connect different types of interfaces between a SC Bus and a mission PL from a pilot project of spacecraft (SC) Bus and mission PL, according to an embodiment of the present invention.
Figures 2, 7B:
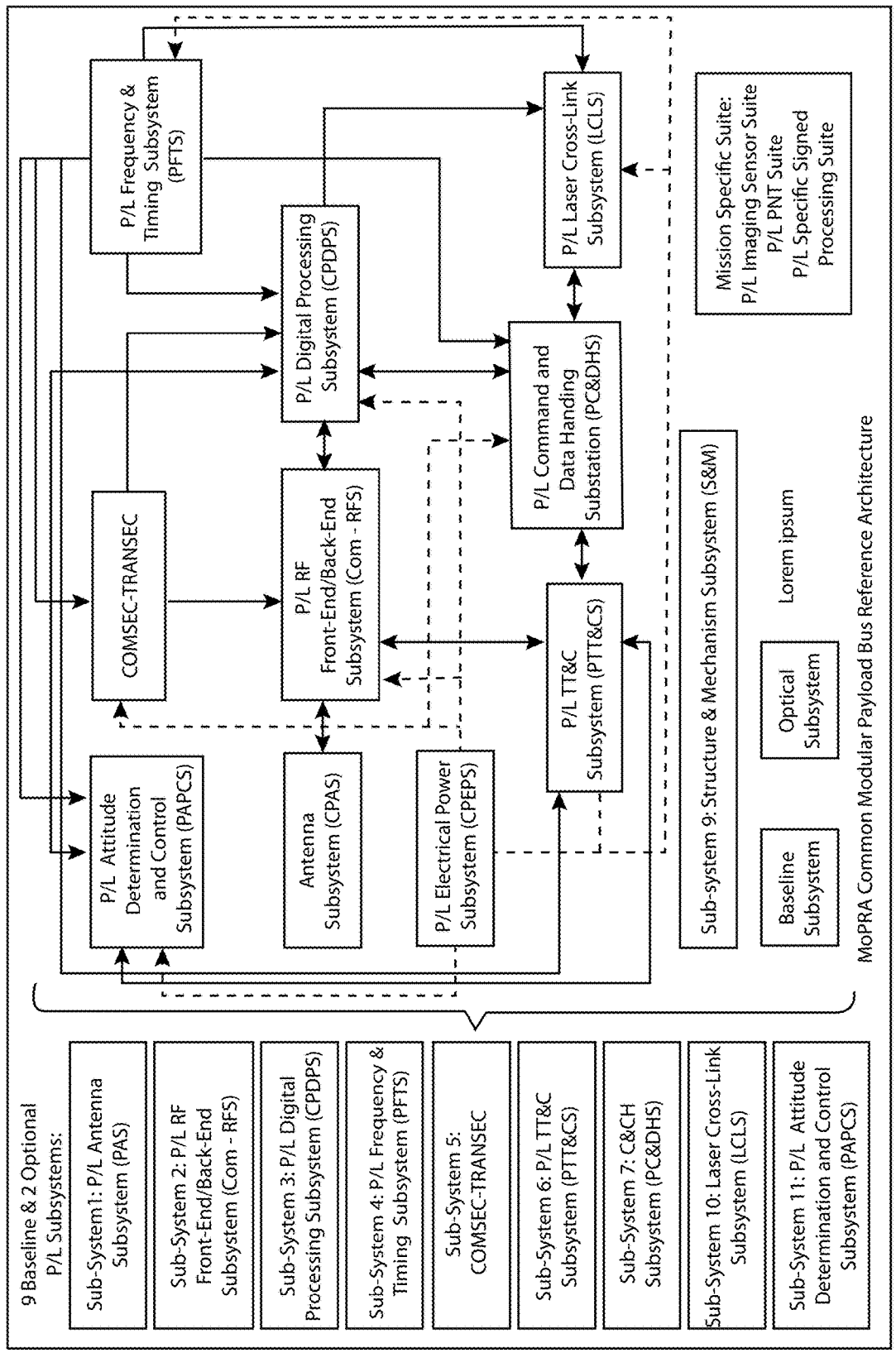
Figures 3, 7B:
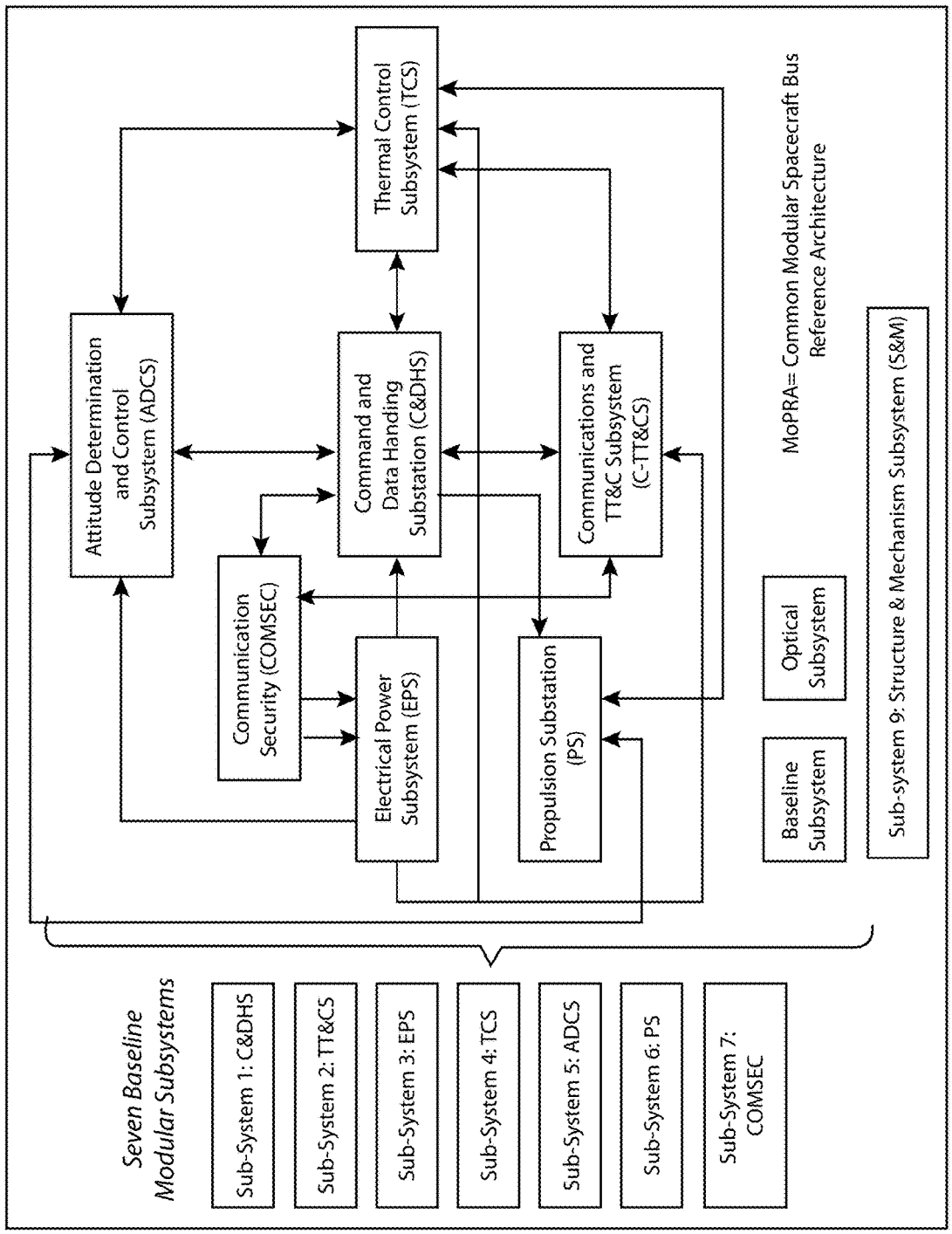

FIGS. 7B-1 to 7B-3, for example, is a diagram 700B-1 to 700B-3 illustrating an example from a pilot project of SC Bus and mission PL, according to an embodiment of the present invention. As shown in FIGS. 7B-1 to 7B-3, the pilot project uses seven interface types—physical-and-mechanical, electrical-power-and-cable, grounding, electromagnetic compatibility (EMC)/electromagnetic interference (EMI)/electrostatic discharge (ESD)/electromagnetic pulse (EMP), thermal, software-message-and-data, and frequency-and-timing-interfaces.

As illustrated in FIGS. 7B-1 to 7B-3, for the pilot project, the preliminary PSIS document is parsed into seven spreadsheets with each spreadsheet representing one of the seven interface types. The concept is to digitize the different interfaces between the SC Bus and mission PL using connectivity matrix concepts.

Figure 8A:
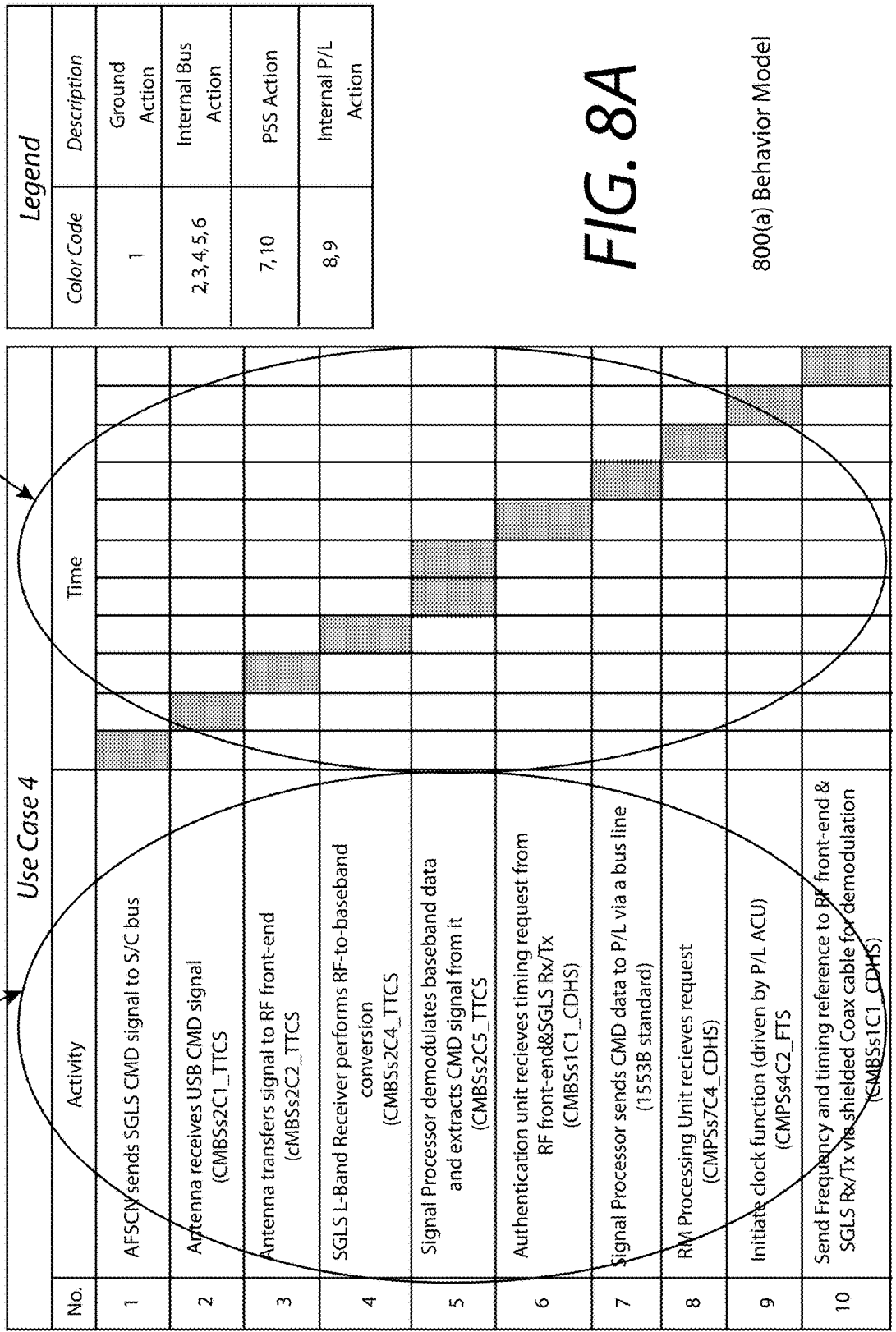
FIGS. 8A and 8B are images representing a proposed approach to digitize an interface for interface (I/F) 1 (a.k.a. Use Case 1) between SC Bus and mission PL using behavioral model, according to an embodiment of the present invention.
Figure 8B:
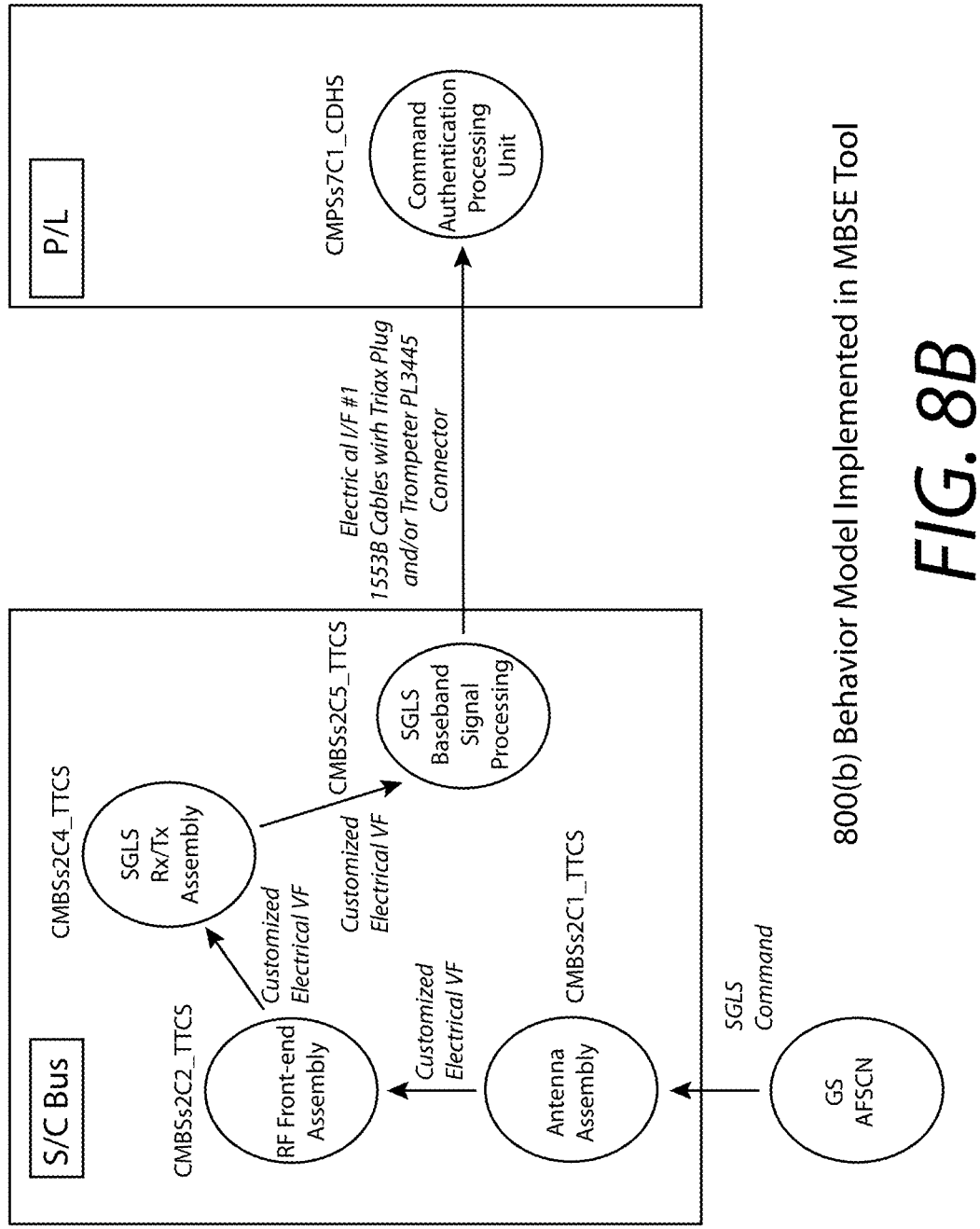

The following are examples shown in FIGS. 8A, 8B, 9A, 9B, 10A, and 10B. For example, images 800(*a*), 800(*b*), 900(*a*), 900(*b*), 1000(*a*), and 1000(*b*) describe how two system elements are electrically interfaced with one another. FIGS. 8A and 8B are images 800(*a*) and 800(*b*) represent a proposed approach to digitize an interface using behavioral model, according to an embodiment of the present invention. Behavioral model captures the required activity and sequence diagrams for a particular use case. In this example, for use case 1, image 800(*a*) shows a specific activity diagram and a required sequence diagram for specifying I/F spec #1, and image 800(*b*) shows a specific implementation of the behavior model for I/F spec #1 in MBSE tool (e.g., NoMagic: Cameo Systems Modeler).

Figure 9A:
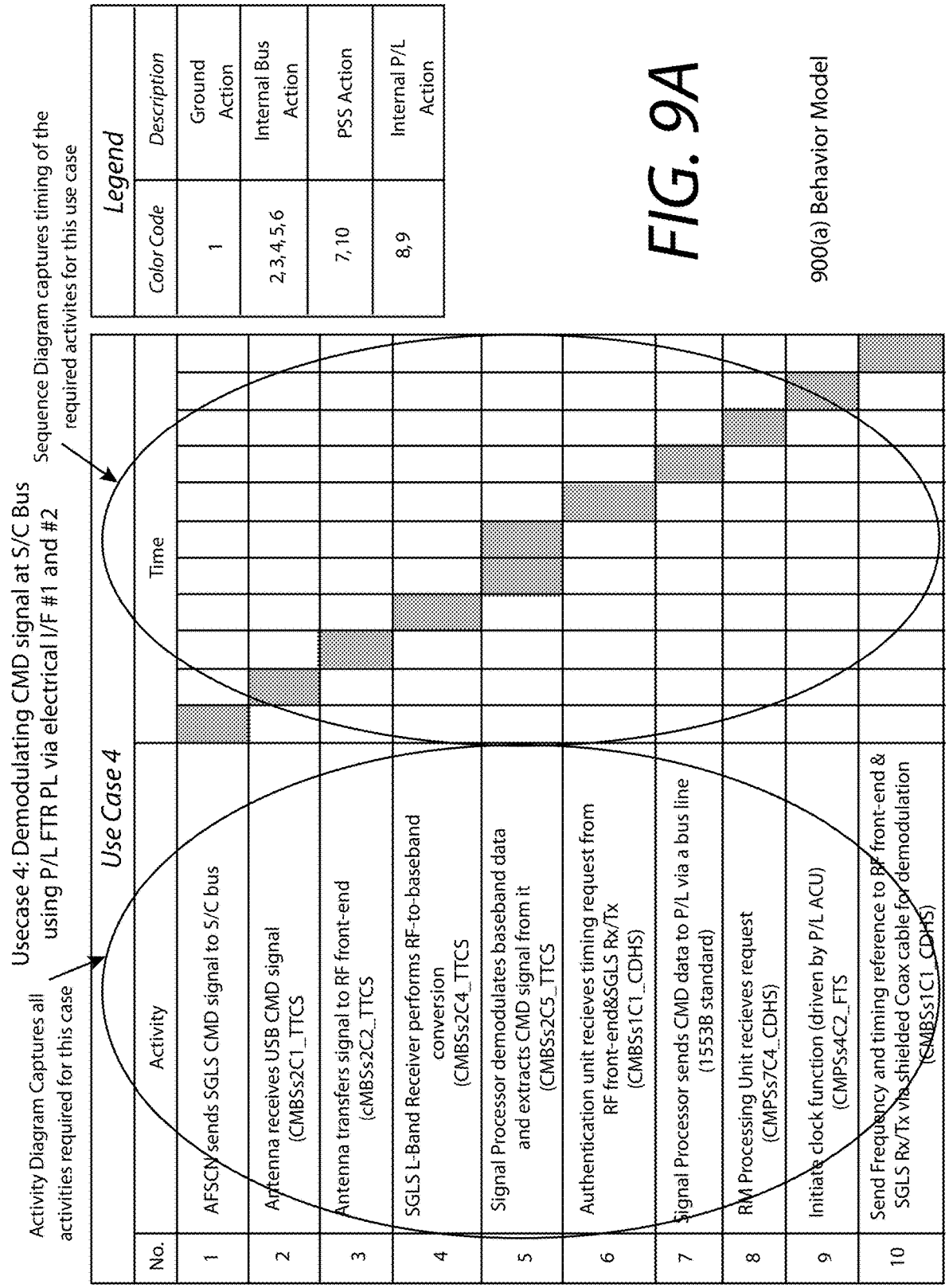
FIGS. 9A and 9B are images representing a proposed approach to digitize an I/F #4 for Use Case 4 using behavioral model, according to an embodiment of the present invention.
Figure 9B:
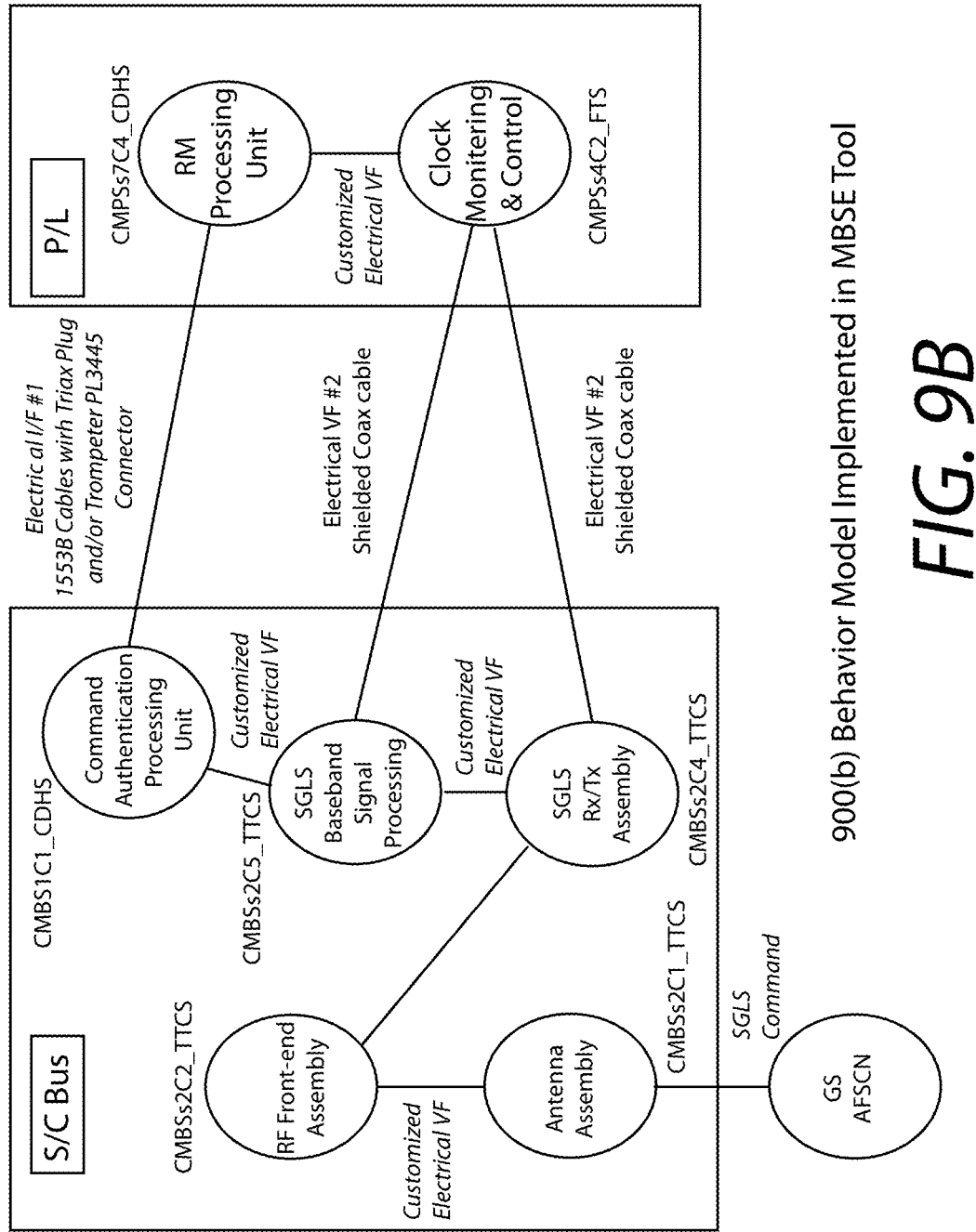

FIGS. 9A and 9B are images 900(*a*) and 900(*b*) representing a proposed approach to digitize an interface using behavioral model, according to an embodiment of the present invention. Behavioral model captures the required activity and sequence diagrams for a particular use case. In this example, for use case 4, image 900(*a*) shows a specific activity diagram and a required sequence diagram for specifying I/F specs #1 and #2, and image 1000(*b*) shows a specific implementation of the behavior model for I/F specs #1 and 2 in MBSE tool (e.g., NoMagic: Cameo Systems Modeler).

Figure 10A:
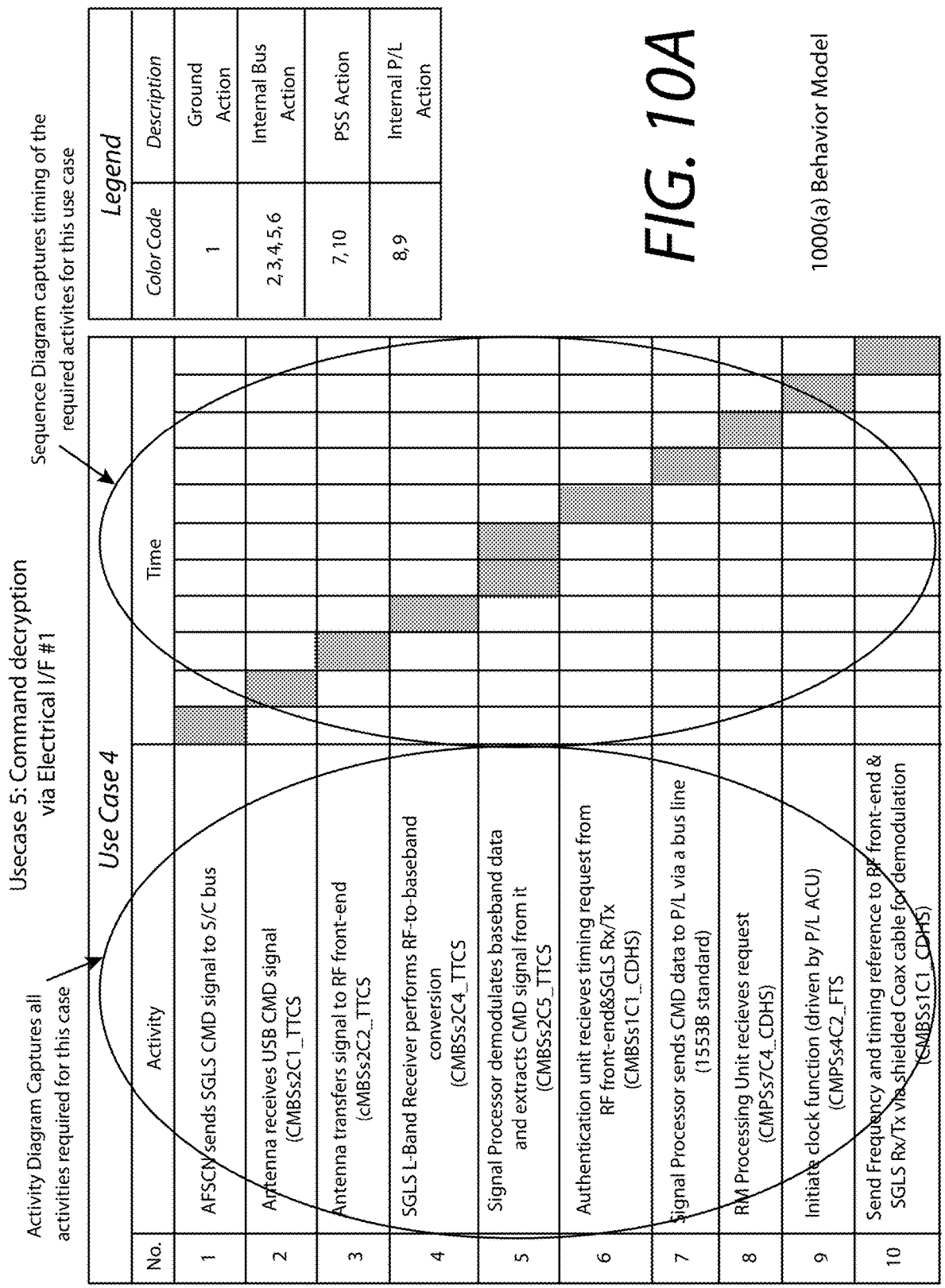
FIGS. 10A and 10B are images representing a proposed approach to digitize an I/F #5 for Use Case 5 using behavioral model, according to an embodiment of the present invention.
Figure 10B:
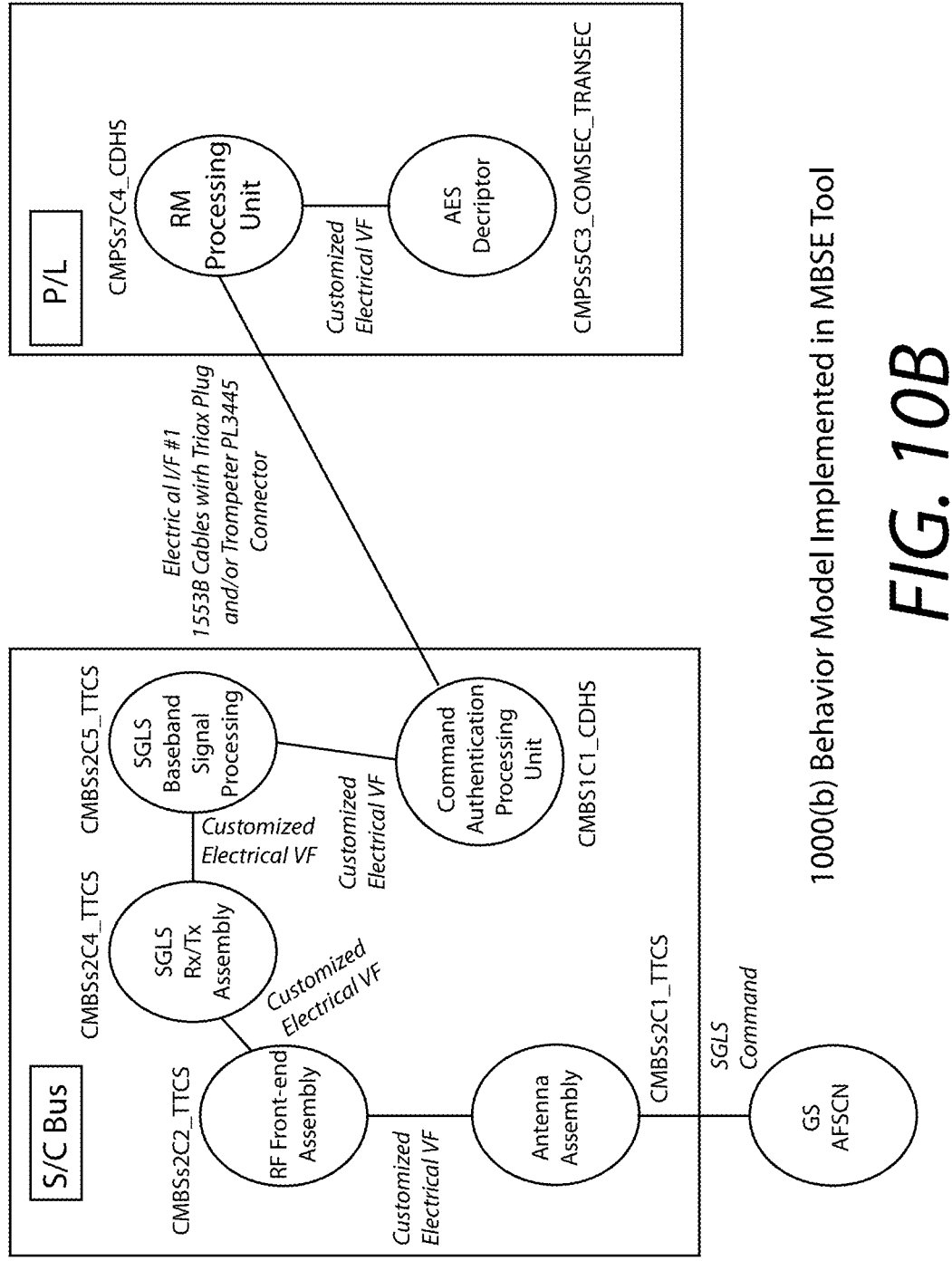

FIGS. 10A and 10B are images 1000(*a*) and 1000(*b*) representing a proposed approach to digitize an interface using behavioral model, according to an embodiment of the present invention. Behavioral model captures the required activity and sequence diagrams for a particular use case. In this example, for use case 5, image 1000(*a*) shows a specific activity diagram and a required sequence diagram for electrical I/F spec #1, and image 1000(*b*) shows a specific implementation of the behavior model for electrical I/F spec #1 in MBSE tool (e.g., NoMagic: Cameo Systems Modeler).

Electrical I/F #1: is the I/F Specification #1 (shown in FIGS. 8A, 8B, 10A, and 10A), which is the electrical Cable interfaces between the mission PL subsystem component 1 (CPAS) and the SC Bus subsystem component 1 (C&DHS) shall be MIL-STD 1553B cables with standard triax plug and/or Trompeter PL3455 connectors or reasonable connectors.

Electrical I/F #2: I/F Specification #2 (see FIGS. 9A and 9B), which is the electrical Cable interfaces between the mission PL subsystem component 1 (CPAS) and the SC Bus subsystem component 2 (TT&CS) shall be ISO Coax cables with required shielding to meet EMC/EMI/EMP requirements.

These electrical I/F specifications will be stored in the DOORS database for PSIS and linked to proper mission PL subsystem components.

Component 3—Advanced Ditigal Model (ADiM) for Use Case Modeling

In a further embodiment, "ADiM" is the basis for characterizing system functionality and associated interface specification in the digital domain. Insight from the "operational application" and "lifecycle core engine" defines digital use cases and associated digital threads. Each specification stored in the DOORS database is linked to a specific digital threat representing its interface type characteristics in digital MBSE domain. For the pilot project, a sample set of digital use cases and associated digital threads were implemented in No-Magic-Cameo MBSE tool. Each I/F specification in DOORS database is represented in the MBSE tool by ADiM behavior models (i.e., activity and sequence diagrams). A common numbering system assigns a specific "Digital Use Case" and "Digital Thread(s)" to each interface specification implemented in the IBM-DOORS database model.

FIGS. 8A, 8B, 9A, 9B, 10A, and 10B, and associated images 800(*a*), 800(*b*), 900(*a*), 900(*b*), 1000(*a*), and 1000(*b*), capture Electrical I/F #1 and Electrical I/F #2 described above in digital MBSE domain. In a first digital use case, namely, Bus Telemetry-Tracking-Commanding Subsystem (TT&CS) to P/L CDHS, the SGLS Uplink Command (CMD) is sent to P/L via an electrical Cable electrical I/F #1 and #2. See, for example, FIGS. 9A and 9B, which are images 900(*a*) and 900(*b*), illustrating ADiM behavior models representing a digital thread for Cable Electrical I/F #1 and Electrical I/F #2, according to an embodiment of the present invention. Next, the uplink command (CMD) SGLS signal is passed to S/C/Bus and to mission P/L via the Cable electrical I/F #1 and #2. The CMD SGLS signal is then demodulated at S/C/Bus using P/L frequency & timing reference subsystem (FTRS) via Cable electrical I/F #2 and CMD signal is passed to Mission P/L for further processing. See FIGS. 8A and 8B, which are also images 800(*a*) and 800(*b*) illustrating ADiM behavior models for digital thread associated with the Cable electrical I/F #1, according to an embodiment of the present invention.

In a second digital use case (Bus TT&CS to P/L COM-SEC), a decryption command is sent via electrical I/F. See, for example, FIGS. 10A and 10B, which are images 1000A and 1000B illustrating a behavioral model for the second digital use case, according to an embodiment of the present invention. Next, P/L fault management detection is used via electrical I/F.

Figure 11:
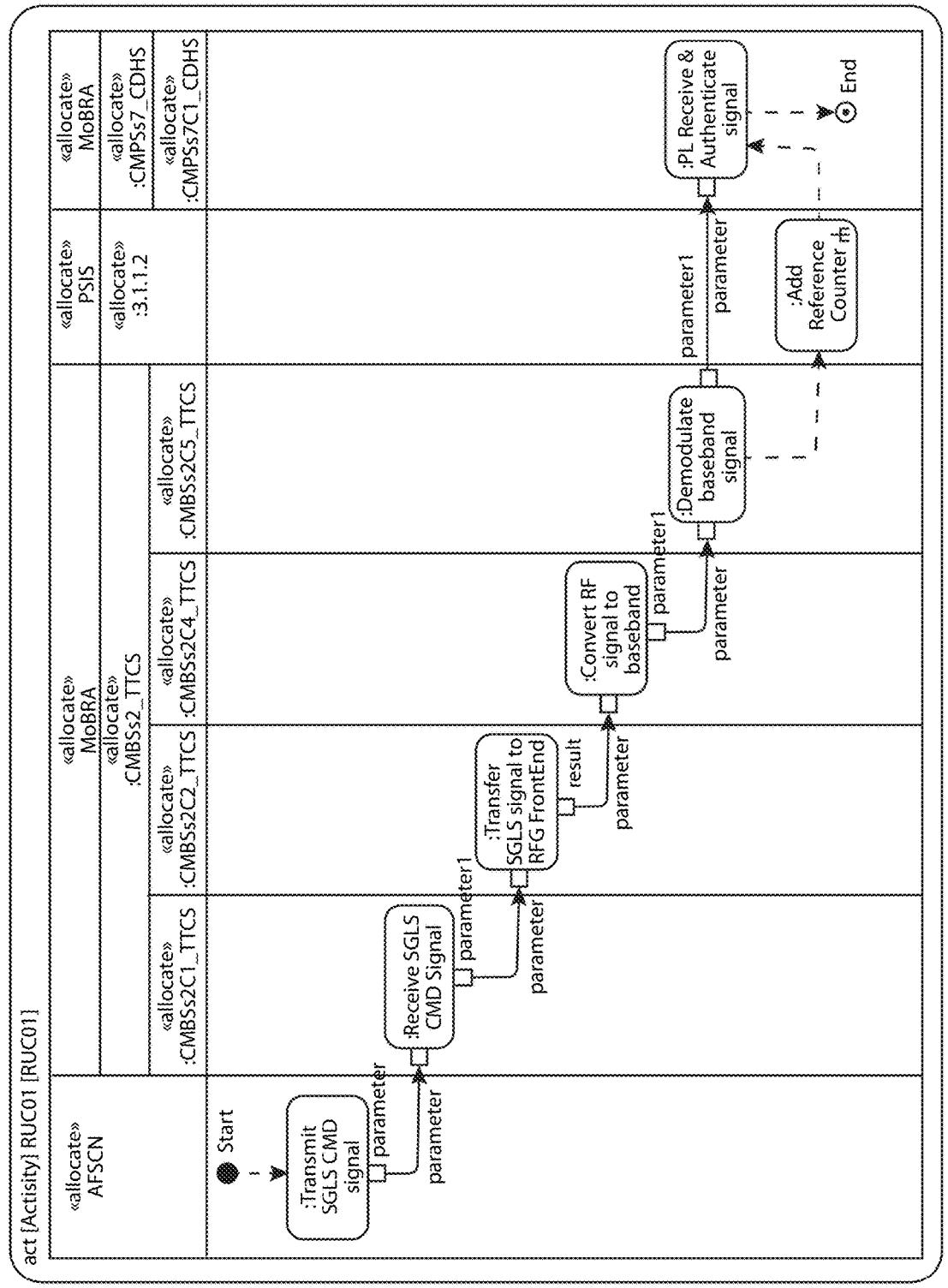
FIG. 11 is an implementation illustrating a selected behavioral model for I/F #1 for use case 1 in MBSE tool, according to an embodiment of the present invention.
Figure 12F:

FIG. 11 is an implementation 1100 illustrating a selected behavioral model for I/F #1 (assigned as use case 1) in MBSE tool, according to an embodiment of the present invention. Note that the use case is capture on the top left box of FIG. 11 representing reference use case 1 (RUCO1). Each of the use case capture specific interface specifications. For example, if you have twenty interface specifications, there may be a unique twenty unique use cases assigned to those interface specifications. In this case, RUCO1 representing the electrical interface specification 1, for example.

FIGS. 12A-F are illustrations 1200A-F showing how information contained in the separate IBM-DOORS digital modules are brought together in a single trace report, according to an embodiment of the present invention. In this embodiment, illustrations 1200A-F show how the SC Bus and the mission PLs are modularized and digitized in IBM-DOORS, and how the databases for DOORS implementation are modularized. Illustrations 1200A-F further describes the modular approach for the implementation of I/F specifications in the DOORS model using modular database implementation approach. This provides traceability between digital models and the traceability of all use cases assigned to each of the interfaces in the DOORS databases. This also provides reusability between the between digital models and the reusability of all use cases assigned to each of the interfaces.

It should be appreciated that the concept is to modularize not only the satellite Bus and mission PL into modular components, but also modularize the DOORS database into a database that maps correspondingly with the MoBRA and MoPRA modular components. The modularization allows for updating the design of a Bus or PL components and updating of the corresponding components in the DOORS database without impacting other components in the DOORS database. This is not a typical use of DOORS database. Note, that the updating is performed using the proposed DE platform described herein.

Component 4—Modular Database

In an embodiment, a modular data storage 108 (see FIG. 1) implements requirements and specifications for the digital system/subsystem and I/F. This requires a database designer to decompose the "big set of requirements" into requirement components stored within a database composed of modular libraries; aligning requirement components and I/F with associated specifications (mapped to an unique set of use cases) stored in the database.

Figure 13:
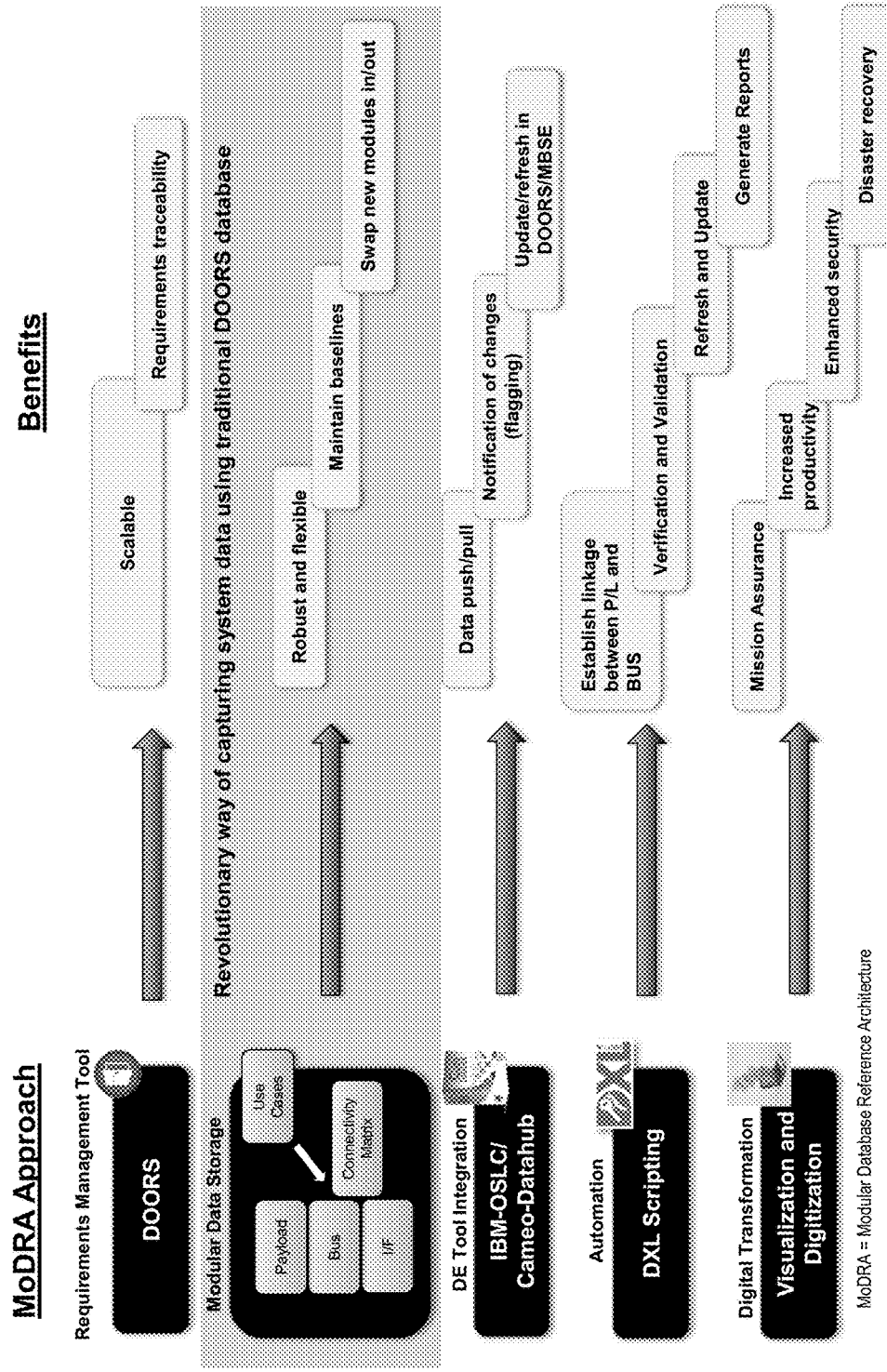
FIG. 13 is a diagram illustrating the benefits of a modular database implementation approach in IBM-DOORS tool, according to an embodiment of the present invention.

FIG. 13 is a diagram illustrating a modular database implementation approach and associated benefits 1300 in IBM-DOORS tool, according to an embodiment of the present invention. In FIG. 13, a preliminary PSIS document is available and captured in Excel Database using CoMaX approach for each interface type. For the pilot project, only electrical interfaces between S/C Bus and mission P/L are captured in Excel Database. The DOORS tool is used to capture PSIS Excel Database using modular storage databases and these databases are linked through the CoMax's ADiM models. In addition, each of the I/F specification (or subsystem requirement) is digitized and assigned a specific use case and associated ADiM behavior model.

Figure 14:
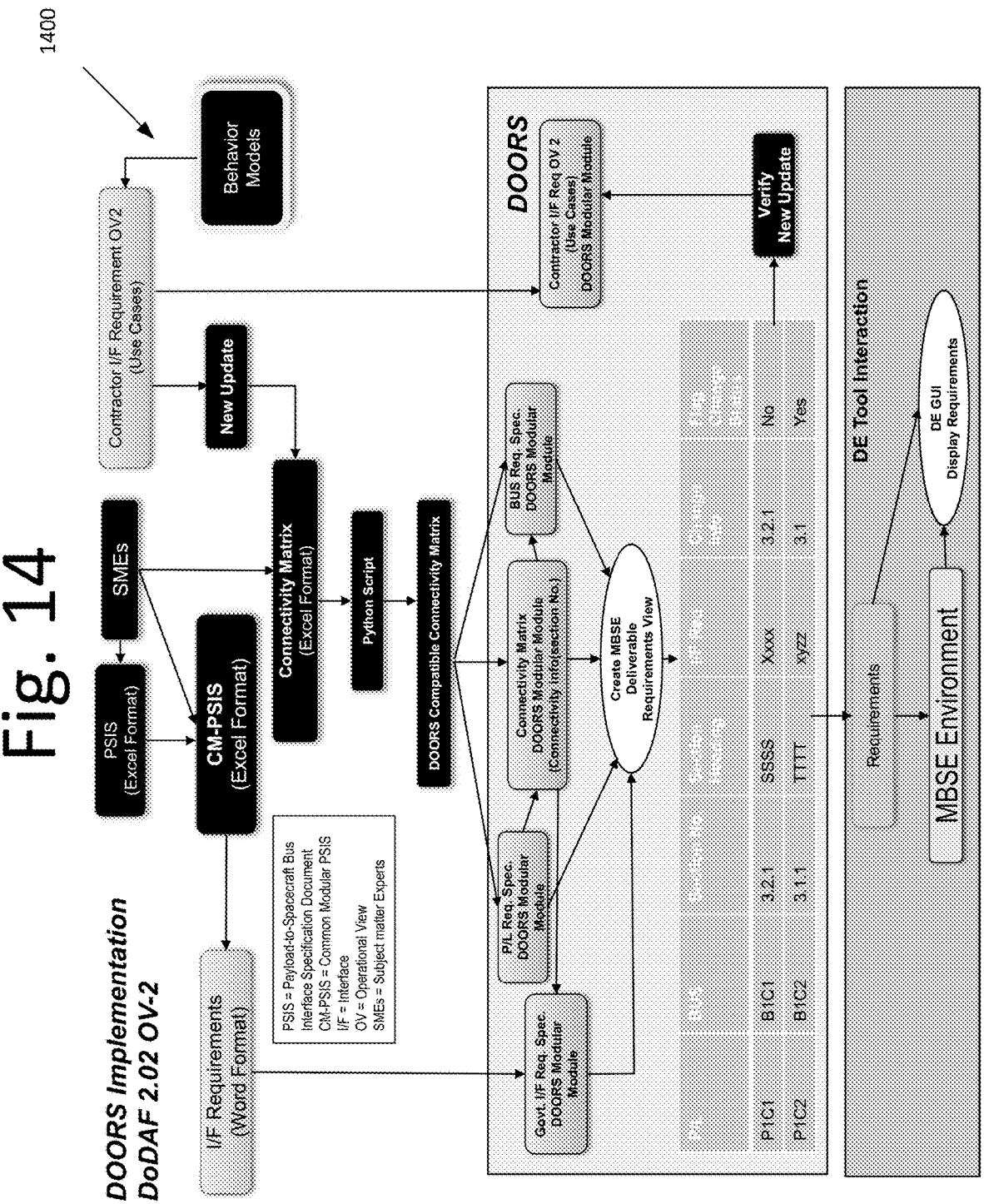
FIG. 14 is a diagram illustrating DOORS implementation of the modular database concepts using DoDAF V2.02 Operational View 2 (OV-2), according to an embodiment of the present invention.

FIG. 14 is a diagram 1400 illustrating DOORS implementation of the modular database concepts. Diagram 1400 is tying the requirements in the DOORS modular database with a digital model implemented MBSE tool, which captures in the form of a CoMax. For example, when the I/F is changing, the CoMax of the utility is updated without impacting other subsystems or components in the DOORS database.

Each of the I/F specifications is digitized using the behavior model(s). Tying the behavior model with the specification requirements in the DOORS database is performed through a modular database concept using the assigned use cases. See, for example, FIGS. 8-10. For each of the specifications, if a verification is required, the use case is specified and a behavior model is retrieved. This allows for verification, validation, or updating via the proposed DE platform. See, for example, FIGS. 5 and 6.

The DOORS implementation approach maintains the links (or connectivity) among the MBSE models and DOORS modular databases models, and also all of the traceability among the specifications, behavioral models, and associated use cases.

When a use case is retrieved, the correct model associated with the corresponding specification is also retrieved. See, for example, FIG. 5. All requirements are maintained in the DOORS modular database, and provide a source of truth, meaning the DOORS modular database is an authority source of truth.

An advantage of using the DOORS modular databases is the ability to swap the new database module without impacting existing interface specifications. This means that there is a robust and flexible way of maintaining the system requirements baseline. This also reduces or eliminates the redundancy of data, improving the overall efficiency of the platform.

Component 5—Data Porting

Returning to FIG. 1, data porting 110 enables two-way information exchange between DOORS modular databases 108 and digitized system architecture models 106 implemented in any MBSE tool. The MBSE tool may include, but is not limited to, No-Magic-Cameo, Rhapsody, or Sparx-EA.

Figure 15:
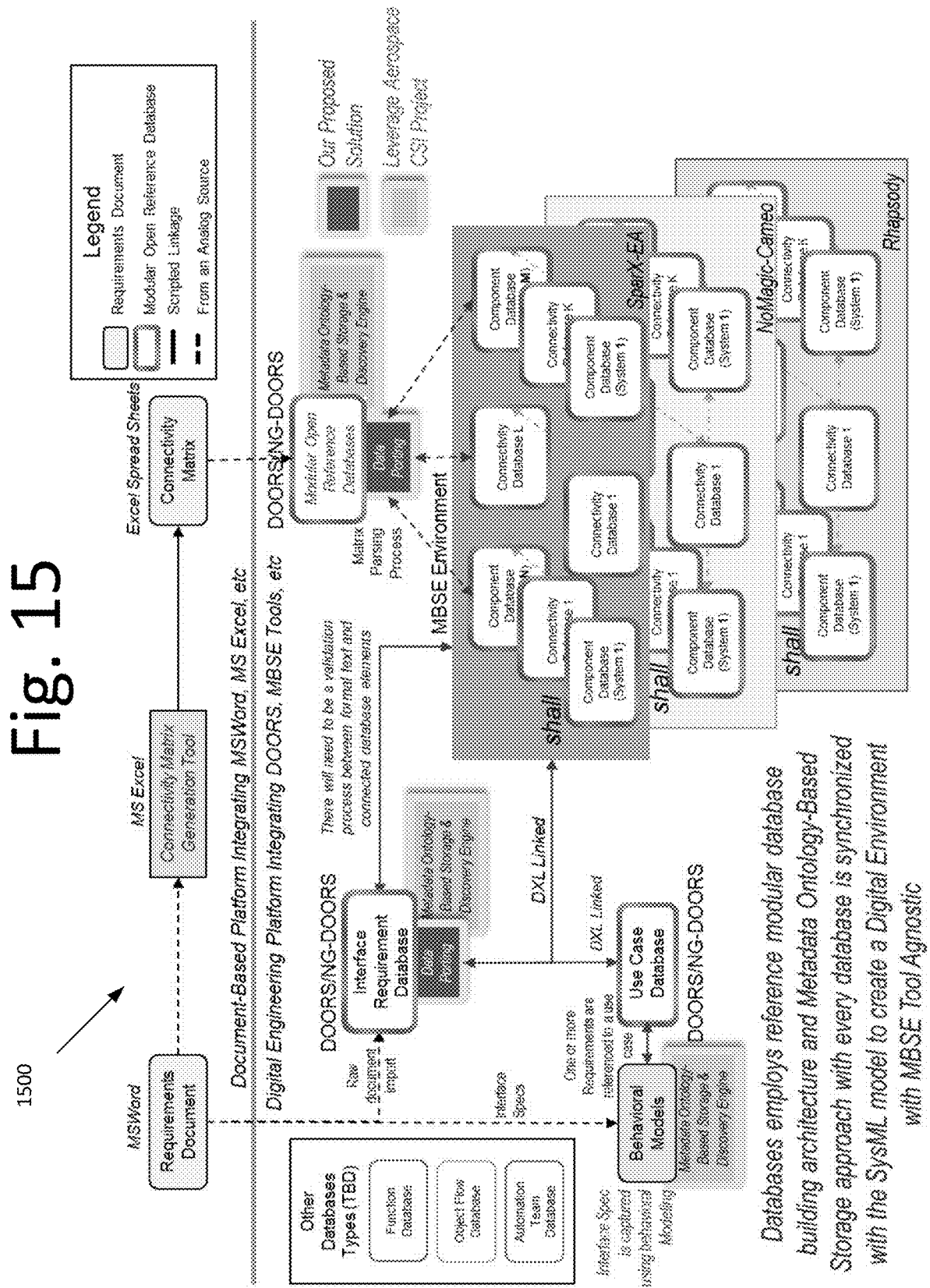
FIG. 15 is a diagram illustrating a proposed implementation of data porting model, according to an embodiment of the present invention.

See, for example, FIG. 15, which is a diagram illustrating a proposed implementation approach of a data porting model 1500, according to an embodiment of the present invention. Data porting model 1500 in this embodiment is based on DODAF artifacts representing a modular system solution (e.g., MoBRA and MoPRA), the implementation of data porting model 1500 at each type of the "Modular" IBM-DOORS database, and the one-to-one mapping between each modular system/subsystem architecture model and modular database module. In certain embodiments, existing DoDAF views and related ontologies and metadata models are leveraged.

Figure 16:
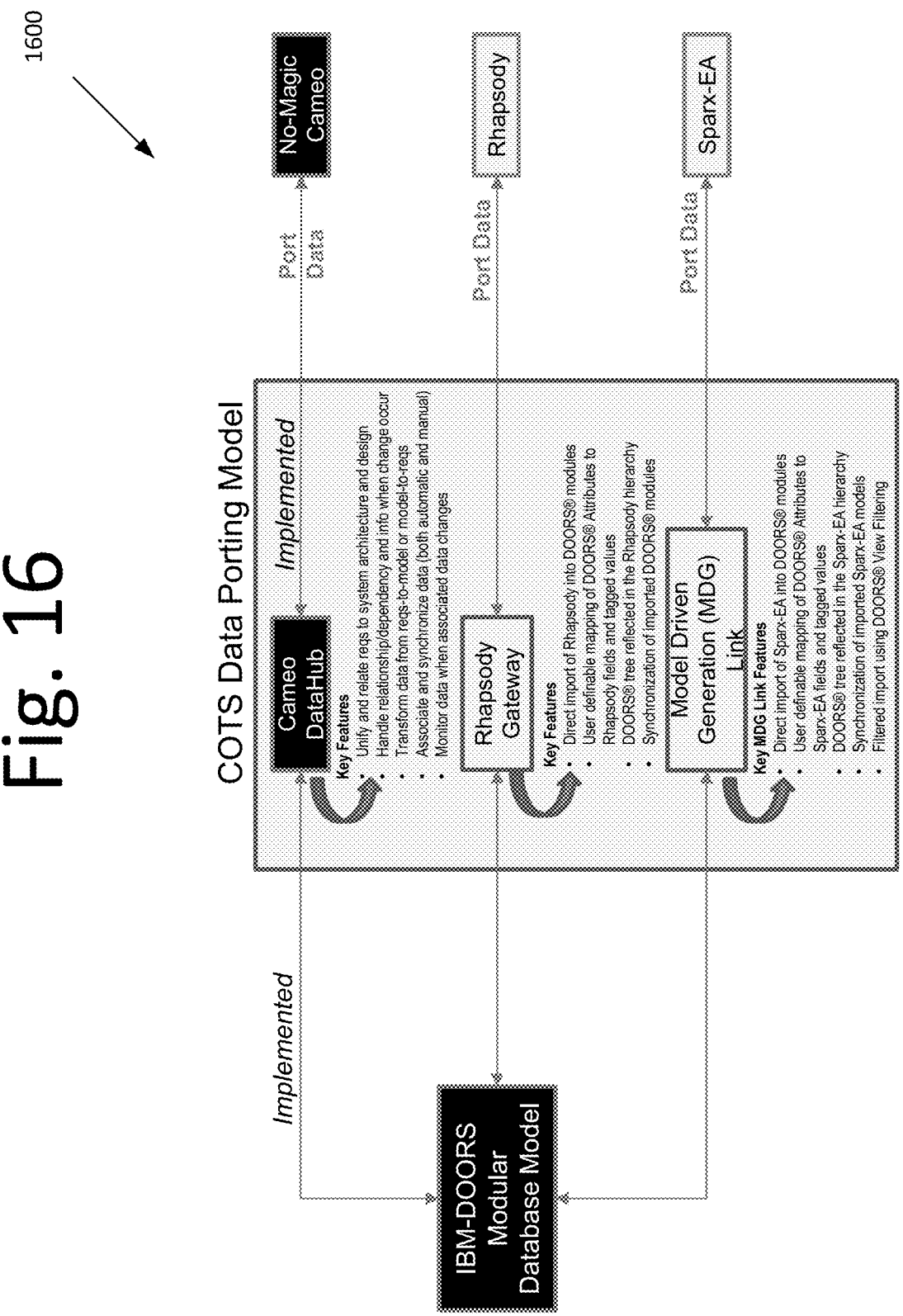
FIG. 16 is a diagram illustrating a brute-force approach for implementation of Commercial Off The Shelf (COTS) data porting model, according to an embodiment of the present invention.

FIG. 16 is a diagram illustrating a COTS data porting model 1600, according to an embodiment of the present invention. It should be noted that although the term "commercial" is used in COTS, the data porting model 1600 is not commonly known or commercial. In some embodiments, COTS data porting model 1600 ports the data from the requirements documents, which is captured in the spreadsheet, into MBSE model. There are different ways to port the data depending on the MBSE tool. For example, Cameo data-hub is used to port the data to the IBM-DOORS modular databases. Note that the IBM-DOORS modular databases capture the system requirement specifications from the spreadsheet discussed earlier.

FIG. 17 is a diagram illustrating a custom design data porting model 1700 using existing Aerospace Huddle™ plugin middleware, according to an embodiment of the present invention. This platform is flexible and robust, i.e., any data porting model can be plugged into the proposed platform.

Figure 18:
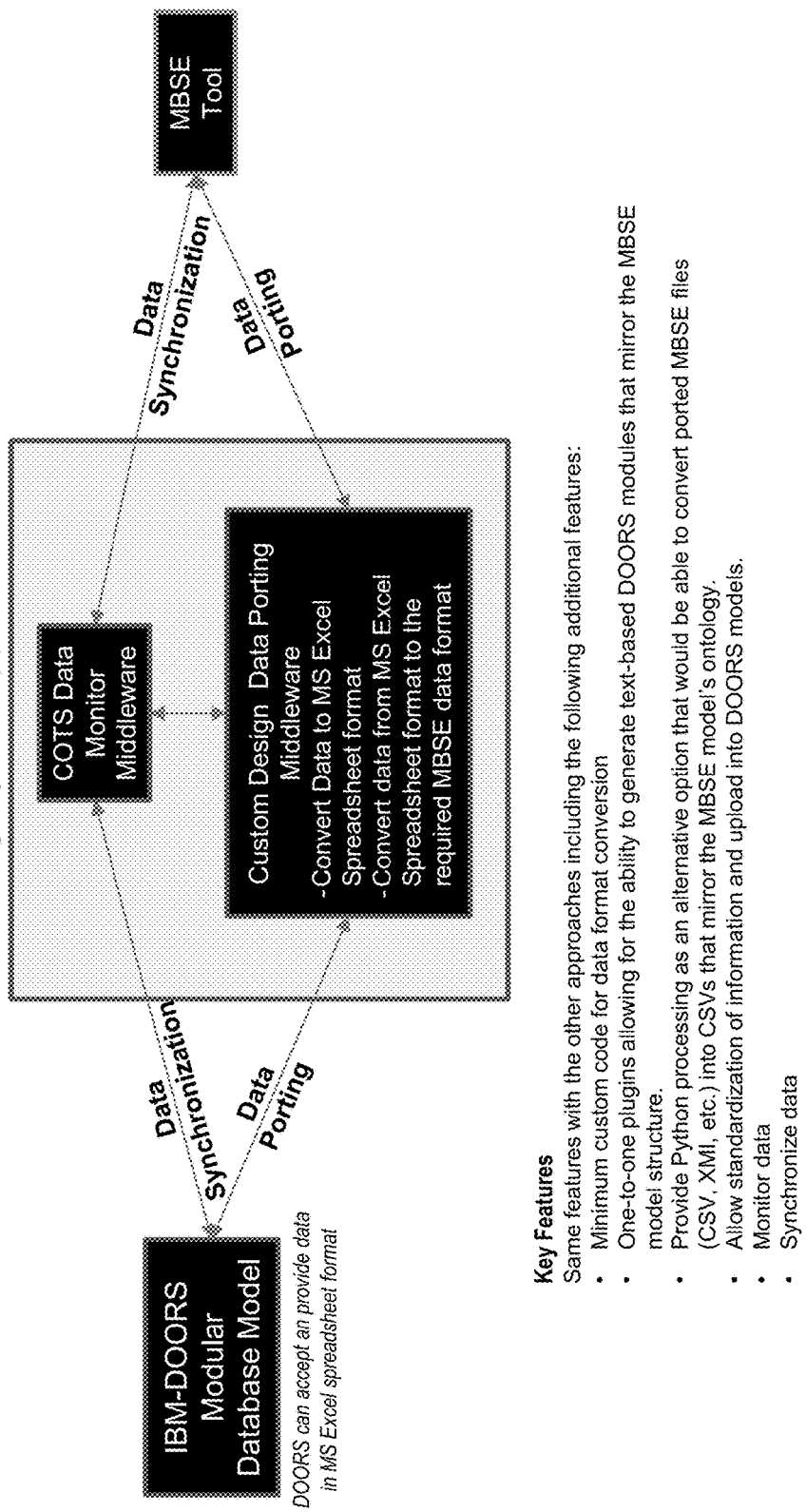
FIG. 18 is a diagram illustrating a hybrid implementation approach and associated key features that accommodates both existing COTS and custom design data porting models to port data to/from the MBSE model to IBM DOORS modular databases, according to an embodiment of the present invention.

FIG. 18 is a diagram illustrating a hybrid approach 1800 that accommodates both existing COTS and custom design data porting models to port data to/from the MBSE model to IBM DOORS modular databases. The proposed approach allows for data synchronization and data porting between COTS and custom design data porting models.

Platform Operational Application

Figure 19:
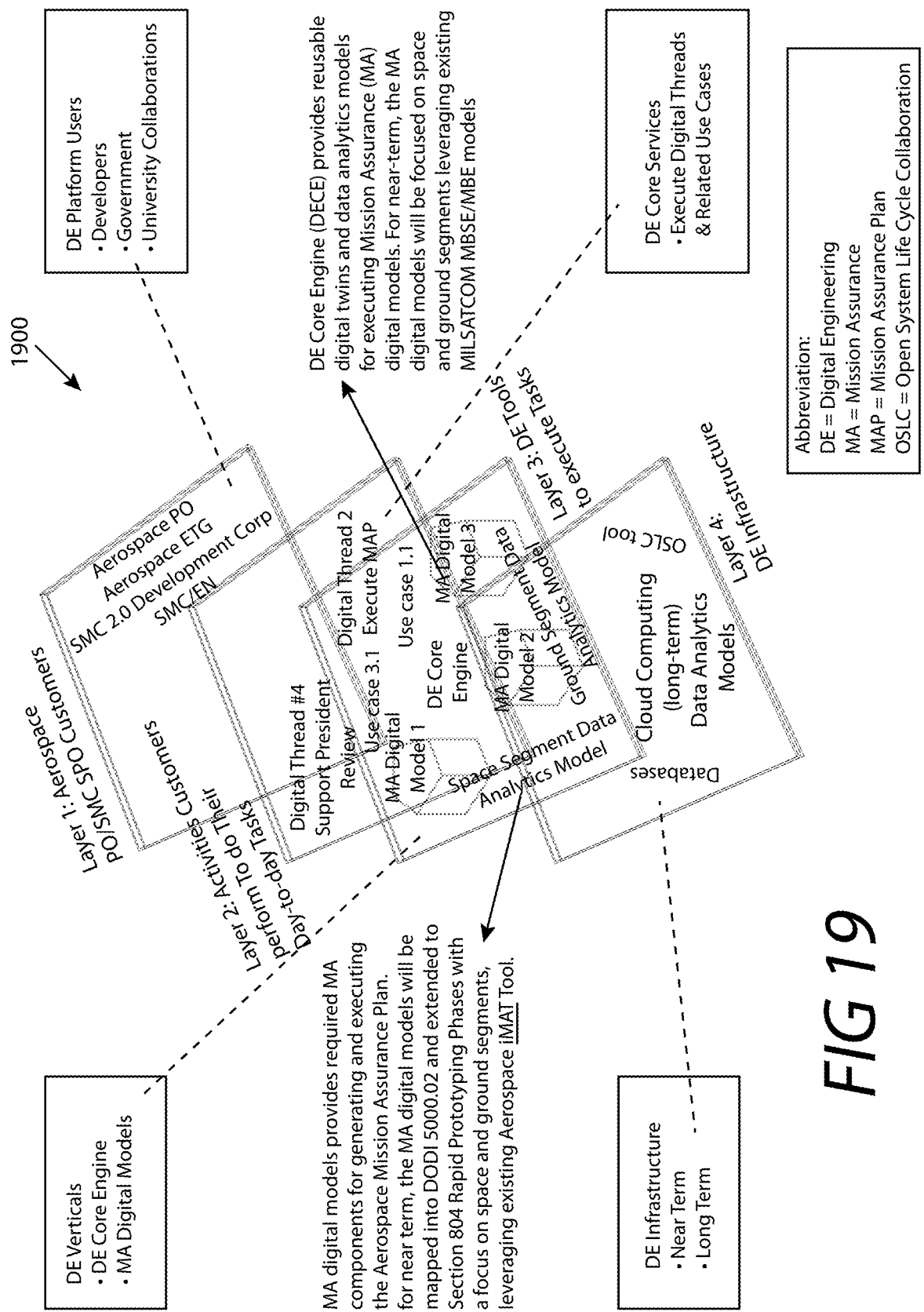
FIG. 19 is a diagram illustrating a DE platform implementation architecture solution at the enterprise level, according to an embodiment of the present invention.

To define realistic use cases and digital threads for the pilot project, a top-level operational concept is defined, which are described by four basic layers for the DE platform. FIG. 19 is a diagram illustrating a DE platform implementation architecture solution 1900, according to an embodiment of the present invention.

Layer 1—DE Platform Users Layer

DE platform users may be defined as developers, program office, associated Government Agencies (e.g., DOD, USAF/SMC, etc.), and university collaborators. DE platform users layer essentially isolates the individuals and organizations that directly interface with DE platform and provide simplified catered access points or understand training needs.

Layer 2—DE Core Services Layer—Defined in Terms of Digital Threads

The DE core services layer focuses on the idea of executables that generate products, results, or verifications, etc., to support system engineering needs and the success of the relevant mission. This can be done through specification/requirements V&V actions, requirements compliance/conformance actions, requirements traceability actions, mission assurance plan (MAP) generation actions, MAP execution actions, and actions to support mission assurance reviews to state a few. Essentially, layer 2 includes actions that exist to take advantage of the DE platform through the various digital threads that have otherwise not traditionally been captured within a single platform.

Layer 3—DE Verticals Layer

Digital core engines are defined as "Digital Twins" representing the source-of-truth data models or standard processes. The data model may exist as a digital model of an exact replica of an aircraft with actual part numbers and model, or the data model may exist as an actual standard acquisition life cycle process. These data models act as the core that other auxiliary models can pull or utilize from.

Mission Assurance (MA) digital models may include digital models that capture MA functions and processes such as mission planning processes, system engineering (SE) processes, space segment system behavior, ground segment system behavior, etc.

Component 1

Reference architecture models employ DoDAF configured to capture systems and systems-of-systems (SOS) architecture artifacts in DE format. DoDAF provides a well-established industry-standard ontology and metadata framework. This allows for seamless sharing system architecture solutions and associated specifications/requirements among stakeholders including prime and sub-contractors.

Component 2

The connectivity matrix (CoMax) is configured to digitize any interface type of interest, including electrical, mechanical, thermal, grounding, EMC/EMI/EMP, software/data and frequency/timing interfaces. This provides a flexible, robust, and agile approach for connecting system elements with different interface types. This enables seamless data exchange between the digital DOORS database and digital system architecture models, easy identification of interface type, and ease of V&V.

Component 3

Behavioral modeling is configured to digitize the interface specification and subsystem/system requirements among system/subsystem components. This ensures each interface specification (or system/subsystem requirement) relates to a specific digital use case and digital thread, unifies the description of each interface specification (or system/subsystem requirement), and provides consistent specifications and requirements V&V.

Component 4

The modular database is configured to capture requirements of the system and subsystem and interface specification in IBM-DOORS database. Benefits of the modular database include, but are not limited to, (i) ease of adding new specification and requirements and subtracting old specification and requirements, (ii) allowing for one-to-one mapping from "system/subsystem architecture component" implemented in MBSE model to "modular storage database component" implemented in IBM-DOORS/IBM-DOORS-Web-Based Access (DWA)/IBM-Next-Gen-DOORS (NGD) model, and (iii) allowing for the system and subsystem architecture components and associated specification and requirement data to port their "specification and requirement data" directly to their corresponding one-to-one mapping modular storage database model and vice versa.

Component 5

Data porting may occur between any of the MBSE models and module database. Some benefits may include: (i) employ existing COTS plug-ins middleware module, (ii) pushing the IBM-DOORS and MBSE tool developers to address the "specification and requirements data porting" between the IBM-DOORS/IBM-DWA/IBM-NGD tools and MBSE tools, and (iii) use existing COTS plugin or a middleware module to achieve significant software development cost saving.

Certain embodiments focus on digitizing a Payload-to-Spacecraft Bus interface, to promote flexibility through modular space vehicle designs and enable efficiencies through mass producing key elements in more cost-effective quantities. Based on existing civil, commercial and military satellite systems, typical numbers of common SC Bus and mission PL components are about 55 and 61, respectively; about 3,355 potential connections. Each connection is represented by a specific I/F specification. Thus, the update, refresh and V&V of PSIS is tedious and time consuming. Some embodiments described herein demonstrate the ability to automate the management of the PSIS databases, including the update, refresh, V&V compliance, and traceability. Automation through the platform is used for digitizing specifications/requirements documents and controlling the required document management processes (e.g., update/refresh and V&V).

Layer 4—De Infrastructure

In an embodiment, the DE infrastructure is developed using No-Magic-Cameo MBSE tool, Standard IBM-DOORS database tool, Excel spread sheet, CSV and MATLAB COTS Software tools.

Tailorable Lifecycle Core Engine

Figure 20:
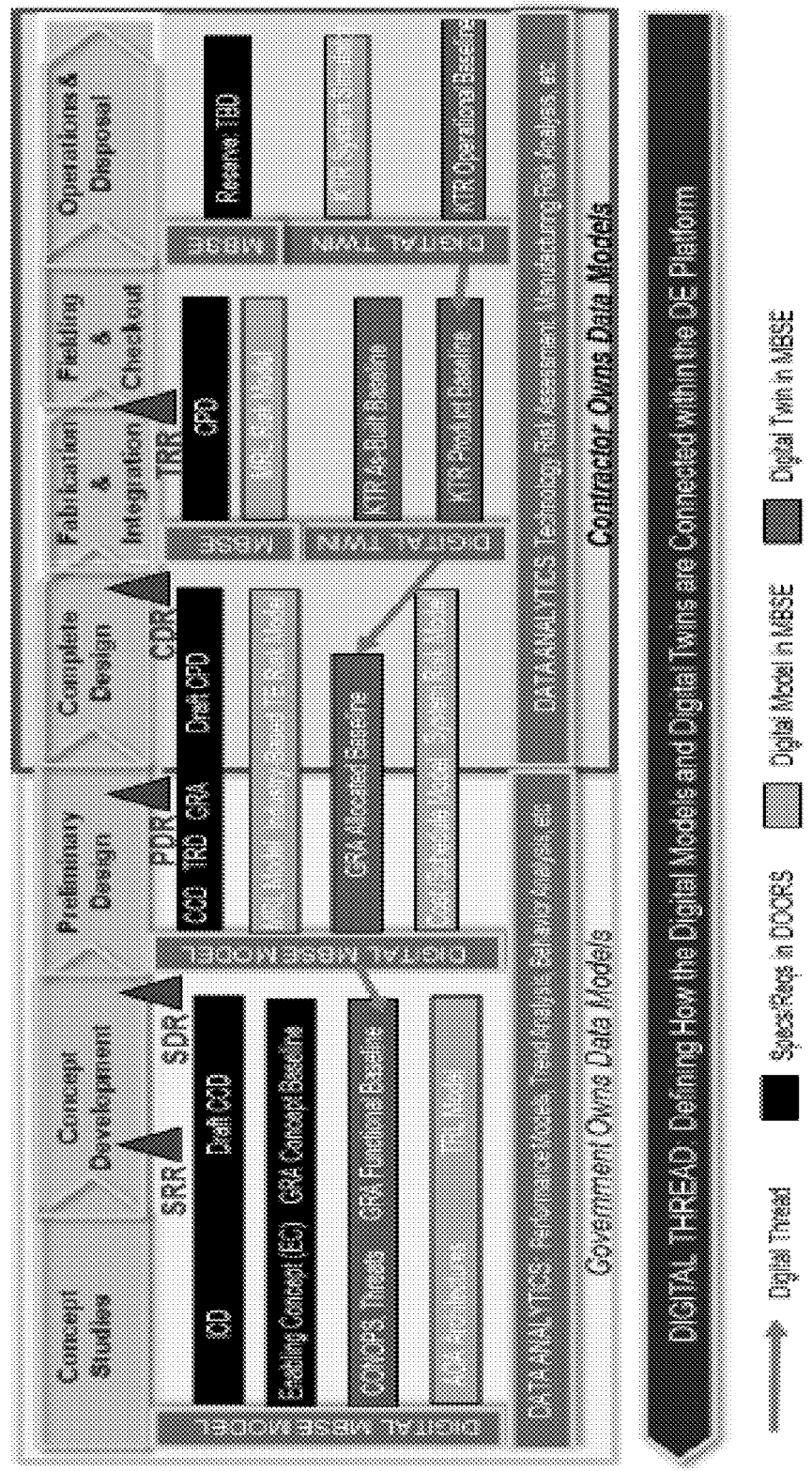
FIG. 20 is a diagram illustrating a baseline core engine, according to an embodiment of the present invention.

FIG. 20 is a diagram illustrating a baseline core engine 2000, according to an embodiment of the present invention. Baseline core engine 2000 in certain embodiments is for the standard DODI 5000.02 acquisition strategy and identifying digital models and associated digital twins throughout a typical program lifecycle. The program lifecycle may include the key system engineering reviews (e.g., System Requirements Review (SRR), System Design Review (SDR), Preliminary Design Review (PDR), Critical Design Review (CDR), and Test Readiness Review (TRR) as well as the corresponding MBSE and IBM-DOORS tools that are used to capture typical program and technical baseline components and artifacts. Baseline core engine 2000 also provides key features to capture the program and technical baseline components that should be owned by Government or corresponding Contractor. As shown in FIG. 20, a digital thread ("Demonstration of the Requirements Traceability for a Contractor (KTR) Operational Baseline") is represented by the "red" arrow showing the trace from the digital twin labeled "KTR operational baseline" back to the digital model labeled "Government Reference Architecture (GRA) Functional Baseline".

In some embodiments, the platform uses a MBSE tool-agnostic approach and modular system architecture with associated databases implemented in DOORS. The platform supports seamless communication with any MBSE tool.

FIG. 21 is a flow diagram illustrating a method 2100 for configuring and executing a digital engineering platform to support space system development and acquisition, according to an embodiment of the present invention. In some embodiments, method 2100 begins at 2105 with capturing by a reference architecture models module key system elements of interest using MBSE and DOORS tools. At 2110, defining by a CM module to define interface or specifications between one or more system elements. The DE platform is configured to digitize the interface using a behavior model, wherein the behavior model captures required activity and/or sequence for a particular use case.

The process steps performed in FIG. 21 may be performed by a computer program, encoding instructions for the processor(s) to perform at least part of the process(es) described in FIG. 21, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system to implement all or part of the process steps described in FIG. 21, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a digital engineering (DE) platform configured to support space system development and acquisition, wherein the DE platform comprising:
a modular reference architecture models module configured to capture key system elements of interest using model-based system engineering (MBSE) and digital object oriented requirements system (DOORS) tools; and
a connectivity matrix module defining interface or associated specifications with a specific interface type between system elements, mission payload and spacecraft bus elements, specific mission operation, and desired mission operation, and
the DE platform is configured to digitize the interface using a behavior model, wherein the behavior model captures required activity and/or sequence for a particular use case.

2. The system of claim 1, wherein the modular reference architecture models module is configured to use a set of modular architecture artifacts using existing Department of Defense Architecture Framework (DoDAF) models providing a systematic way of describing a system architecture consistently in a System-of-Systems (SOS) environment.

3. The system of claim 1, wherein the connectivity matrix module is configured to capture each connection type of an interface type in a single Excel spreadsheet in a matrix format,
the spreadsheet is digitized using MBSE models, allowing the spreadsheet to be shared in a web format, and
the specifications are digitized using one or more specific use cases and associated behavior models implemented in a MBSE tool.

4. The system of claim 1, wherein the connectivity matrix module comprises a plurality of columns and rows that intersect with one another,
the intersection representing interface specifications between mission payload subsystem components and spacecraft Bus subsystem components,
the interface specifications are digitized using a specific use case number and associated behavioral model, and
the specific use case number and the associated behavioral model are implemented in a MBSE tool.

5. The system of claim 1, wherein the DE platform further comprises digital use modeling modules configured to characterize system functionality and related interfaces in a digital domain.

6. The system of claim 1, wherein the DE platform further comprises a modular database used to implement requirements and specifications for digital systems and subsystem and interface.

7. The system of claim 1, wherein the DE platform further comprises data porting configured to enable two-way information exchange between modular database and digital use modeling module.

8. The system of claim 1, wherein the DE platform utilizes a layered approach to define realistic use cases and related digital threads, define interconnection between realistic the use cases and the related digital threads for a project, allowing for real-time demonstration of interconnection between the use cases and the digital threads,
the layered approach comprises a DE platform users layer, DE core services layer, DE verticals layer, and DA infrastructure, each of which are connected with each other based on key open system interfaces derived from key Department of Defense (DOD) open subsystem tools.

9. The system of claim 8, wherein the DE platform users layer is configured to isolate individual users and organizations level users that directly interface with the DE platform.

10. The system of claim 9, wherein the DE core services layer is configured to execute one or more digital threads and one or more related uses cases.

11. The system of claim 10, wherein the DE verticals layer comprises digital core engines and mission assurance (MA) digital models for each of the one or more digital threads in the DE core services layer.

12. The system of claim 11, wherein the DE core engine provides re-usable digital twin and data analytics models for executing the MA digital models and related mission assurance plan (MAP) digital models, providing required MA components for generating and executing a mission plan.

13. The system of claim 12, wherein a DE infrastructure is configured to integrate a proposed DE platform with an existing DE infrastructure.

14. A computer program product comprising a computer program embodied on a non-transitory computer readable medium, the computer program, when executed, is configured to cause at least one processor to:
provide a digital engineering (DE) platform configured to support space system development and acquisition, wherein
the computer program, when executed, is further configured to cause the at least one processor to
capture, by a modular reference architecture models module, key system elements of interest using model-based system engineering (MBSE) and digital object oriented requirements system (DOORS) tools, and
define, by a connectivity matrix module, an interface or associated specifications with a specific interface type between system elements, mission payload and spacecraft bus elements, specific mission operation, and desired mission operation, and
digitize, by the DE platform, the interface using a behavior model, wherein the behavior model captures required activity and/or sequence for a particular use case.

15. The computer program product of claim 14, wherein the computer program, when executed, is further configured to cause the at least one processor to use, by the modular reference architecture models module, a set of architecture artifacts using existing Department of Defense Architecture Framework (DoDAF) models providing a systematic way of describing a system architecture consistently in a System-of-Systems (SOS) environment.

16. The computer program product of claim 14, wherein the computer program, when executed, is further configured to cause the at least one processor to
capture, by the connectivity matrix module, each connection type of an interface type in a single Excel spreadsheet in a matrix format,
digitize the spreadsheet using MBSE models, allowing the spreadsheet to be shared in a web format, and
digitize the specifications using one or more specific use cases and associated behavior models implemented in a MBSE tool.

17. The computer program product of claim 14, wherein the connectivity matrix module comprises a plurality of columns and rows that intersect with one another,
the intersection representing interface specifications between mission payload subsystem components and spacecraft Bus subsystem components,
the interface specifications are digitized using a specific use case number and associated behavioral model, and
the specific use case number and the associated behavioral model are implemented in a MBSE tool.

18. The computer program product of claim 17, wherein the computer program, when executed, is further configured to cause the at least one processor to characterize, by digital use modeling modules, system functionality in a digital domain.

19. The computer program product of claim 14, wherein the computer program, when executed, is further configured to cause the at least one processor to implement, by a modular database, requirements and specifications for digital systems and subsystem and interface.

20. The computer program product of claim 14, wherein the computer program, when executed, is further configured to cause the at least one processor to enable, by data porting, two-way information exchange between modular database and digital use modeling module.

21. The computer program product of claim 14, wherein the computer program, when executed, is further configured to cause the at least one processor to utilize a layered approach to define realistic use cases and digital threads, define interconnection between realistic the use cases and the digital threads for a project, allowing for real-time demonstration of interconnection between the use cases and the digital threads,
the layered approach comprises a DE platform users layer, DE core services layer, DE verticals layer, and DA infrastructure, each of which are connected with each other based on key open system interfaces derived from key Department of Defense (DOD) open subsystem tools.

22. The computer program product of claim 21, wherein the computer program, when executed, is further configured to cause the at least one processor to isolate, in the DE platform users layer, individual users and organizations level users that directly interface with the DE platform.

23. The computer program product of claim 22, wherein the computer program, when executed, is further configured to cause the at least one processor to execute, in the DE core services layer, one or more digital threads and one or more related uses cases.

24. The computer program product of claim 23, wherein the DE verticals layer comprises digital core engines and mission assurance (MA) digital models for each of the one or more digital threads in the DE core services layer.

25. The computer program product of claim 24, wherein the computer program, when executed, is further configured to cause the at least one processor to provide, using the DE core engine, re-usable digital twin and data analytics models for executing the MA digital models and related mission assurance plan (MAP) digital models, providing required MA components for generating and executing a mission plan.

26. The computer program product of claim 25, wherein the computer program, when executed, is further configured to cause the at least one processor to integrate, using a DE infrastructure, a proposed DE platform with an existing DE infrastructure.

27. A computer-implemented method for supporting space system development and acquisition using a digital engineering (DE) platform, comprising:
    capturing, by a modular reference architecture models module, key system elements of interest using model-based system engineering (MBSE) and digital object oriented requirements system (DOORS) tools;
    defining, by a connectivity matrix module, an interface or associated specifications with a specific interface type between system elements, mission payload and spacecraft bus elements, specific mission operation, and desired mission operation; and
    digitizing the interface using a behavior model, wherein the behavior model captures required activity and/or sequence for a particular use case.

28. The computer-implemented method of claim 27, further comprising:
    providing, by the reference architecture models module, a systematic way of describing a system architecture consistently in a System-of-Systems (SOS) environment, wherein the providing of the systematic way comprising using a set of architecture artifacts using existing Department of Defense Architecture Framework (DoDAF) models.

29. The computer-implemented method of claim 27, further comprising:
    capturing, by the connectivity matrix module, each connection type of an interface type in a single Excel spreadsheet in a matrix format;
    digitizing the spreadsheet using MBSE models, allowing the spreadsheet to be shared in a web format; and
    digitizing the specifications using one or more specific use cases and associated behavior models implemented in a MBSE tool.

30. The computer-implemented method of claim 27, wherein the connectivity matrix module comprises a plurality of columns and rows that intersect with one another, the intersection representing interface specifications between mission payload subsystem components and spacecraft Bus subsystem components,
    the interface specifications are digitized using a specific use case number and associated behavioral model, and
    the specific use case number and the associated behavioral model are implemented in a MBSE tool.

31. The computer-implemented of claim 27, further comprising:
    characterizing, by a digital use modeling module, a system functionality in a digital domain.

32. The computer-implemented of claim 27, further comprising:
    implementing, by a modular database, requirements and specifications for digital systems and subsystem and interface.

33. The computer-implemented of claim 27, further comprising:
    enabling, using data porting, two-way information exchange between modular database and digital use modeling module.

34. The computer-implemented of claim 27, further comprising:
    utilizing a layered approach to define realistic use cases and digital threads, define interconnection between realistic the use cases and the digital threads for a project, allowing for real-time demonstration of interconnection between the use cases and the digital threads,
    the layered approach comprises a DE platform users layer, DE core services layer, DE verticals layer, and DA infrastructure, each of which are connected with each other based on key open system interfaces derived from key Department of Defense (DOD) open subsystem tools.

35. The computer-implemented method of claim 34, further comprising:
    isolating, at the DE platform users layer, individual users and organizations level users that directly interface with the DE platform.

36. The computer-implemented method of claim 35, further comprising:
    executing, at the DE core services layer, one or more digital threads and one or more related uses cases.

37. The computer-implemented method of claim 36, wherein the DE verticals layer comprises digital core engines and mission assurance (MA) digital models for each of the one or more digital threads in the DE core services layer.

38. The computer-implemented method of claim 37, wherein the DE core engine provides re-usable digital twin and data analytics models for executing the MA digital models and related mission assurance plan (MAP) digital models, providing required MA components for generating and executing a mission plan.

39. The computer-implemented method of claim 38, further comprising:
    integrating, by a DE infrastructure, a proposed DE platform with an existing DE infrastructure.

* * * * *